US008687198B2

(12) United States Patent
Salit et al.

(10) Patent No.: US 8,687,198 B2
(45) Date of Patent: Apr. 1, 2014

(54) COUPLED CAVITY DISPERSION ENHANCED RING LASER GYROSCOPE

(75) Inventors: Mary K. Salit, Plymouth, MN (US); Kenneth Salit, Plymouth, MN (US); Paul E. Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 359 days.

(21) Appl. No.: 13/237,212

(22) Filed: Sep. 20, 2011

(65) Prior Publication Data
US 2013/0070253 A1  Mar. 21, 2013

(51) Int. Cl.
*G01C 19/66* (2006.01)
(52) U.S. Cl.
USPC .......................................... 356/469; 356/470
(58) Field of Classification Search
USPC .................. 356/468–470, 472, 473; 372/94
See application file for complete search history.

(56) References Cited

U.S. PATENT DOCUMENTS

| 4,220,928 | A | | 9/1980 | Bloom et al. | |
|---|---|---|---|---|---|
| 4,556,319 | A | * | 12/1985 | Gauert et al. | 356/472 |
| 4,632,555 | A | * | 12/1986 | Malvern | 356/472 |
| 4,673,293 | A | * | 6/1987 | Sanders | 356/470 |
| 4,807,999 | A | * | 2/1989 | Soo Hoo | 356/470 |
| 4,815,851 | A | | 3/1989 | Soohoo | |
| 4,952,059 | A | | 8/1990 | Desurvire et al. | |
| 4,968,136 | A | | 11/1990 | Lim et al. | |
| 5,025,446 | A | | 6/1991 | Kuizenga | |
| 5,166,949 | A | | 11/1992 | Perlmutter | |
| 5,442,442 | A | | 8/1995 | Kanegsberg et al. | |
| 5,577,057 | A | | 11/1996 | Frisken | |
| 6,002,481 | A | | 12/1999 | Bielas et al. | |
| 6,208,414 | B1 | | 3/2001 | Killpatrick et al. | |
| 6,456,417 | B1 | | 9/2002 | Maywar et al. | |
| 6,856,716 | B2 | | 2/2005 | Mukai | |
| 7,058,111 | B2 | | 6/2006 | Seiber | |
| 7,062,131 | B2 | | 6/2006 | Ilchenko | |
| 7,085,304 | B2 | | 8/2006 | Vetrovec | |
| 7,149,231 | B2 | | 12/2006 | Afzal et al. | |
| 7,180,657 | B1 | | 2/2007 | Shevy | |
| 7,359,059 | B2 | | 4/2008 | Lust et al. | |

(Continued)

OTHER PUBLICATIONS

Fox et al. , "Effects of Gain Saturation on the Oscillating Modes of Optical Masers", "IEEE Journal of Quantum Electronics", Dec. 1966, pp. 774-783, vol. QE-2, No. 12, Publisher: IEEE (Continued)

*Primary Examiner* — Tucker Wright
*Assistant Examiner* — Violeta Prieto
(74) *Attorney, Agent, or Firm* — Fogg & Powers LLC

(57) ABSTRACT

A ring laser gyroscope includes active cavity containing gain medium, first reflective surfaces coupled to active cavity, medium exciter to excite gain medium, second reflective surfaces coupled to first passive cavity, and third reflective surfaces coupled to second passive cavity. Excited gain medium induces first and second laser fields within active cavity. First plurality of reflective surfaces includes first, second, and third reflective surfaces that reflect light within active cavity. Second plurality of reflective surfaces includes first, fourth, and fifth reflective surfaces that reflect light within first passive cavity. Third plurality of reflective surfaces includes fourth, sixth, and seventh reflective surfaces that reflect light within second passive cavity. First and fourth reflective surfaces are partially transmissive such that they both transmit and reflect light. Second or third cavities induce frequency dependent phase shift on light traveling through ring laser gyroscope causing anomalous dispersion of first and second laser fields passing through gain medium.

16 Claims, 12 Drawing Sheets

(56) References Cited

U.S. PATENT DOCUMENTS

| | | | |
|---|---|---|---|
| 7,804,600 | B1 | 9/2010 | Smith |
| 7,907,284 | B2* | 3/2011 | Strabley .................. 356/469 |
| 8,319,973 | B2* | 11/2012 | Yang ..................... 356/469 |
| 8,422,022 | B2* | 4/2013 | Salit et al. ............. 356/469 |
| 8,432,551 | B2* | 4/2013 | Salit et al. ............. 356/469 |
| 8,451,451 | B2* | 5/2013 | Salit et al. ............. 356/473 |
| 2001/0036011 | A1 | 11/2001 | Galstain |
| 2003/0123784 | A1 | 7/2003 | Mukai |
| 2004/0066805 | A1 | 4/2004 | Afzal et al. |
| 2006/0029112 | A1 | 2/2006 | Young et al. |
| 2007/0071059 | A1 | 3/2007 | Afzal et al. |
| 2007/0189350 | A1 | 8/2007 | Young et al. |
| 2008/0278710 | A1 | 11/2008 | Schmidt et al. |
| 2009/0116520 | A1 | 5/2009 | Oozeki |
| 2009/0232172 | A1 | 9/2009 | Masuda et al. |
| 2010/0014091 | A1 | 1/2010 | Strabley |

OTHER PUBLICATIONS

Apruzese et al., "Some Effects of Radiative and Collisional Broadening on Line Emission in a Spherical, Laser-Heated Plasma", "Journal of Quantitative Spectroscopy and Radiative Transfer", Sep. 10, 1976, pp. 557-562, vol. 17, No. 5.

Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.

Bennett, Jr., "Hole Burning Effects in a He-Ne Optical Maser", "Physical Review", Apr. 15, 1962, pp. 580-594, vol. 126, No. 2.

Chang, "Gain-Assisted Superluminal Propagation in Coupled Optical Resonators", "Journal of the Optical Society of America B", Oct. 2005, pp. 2237-2241, vol. 22, No. 10, Publisher: Optical Society of America.

Du, "Understanding the Characteristics of Gain Saturation for Homogeneously Broadened Laser Medium From the Point of View Of", "http://spie.org/etop/2007/etop07fundamentalsIV.pdf", Jan. 3, 2007, pp. 1-4.

Windholz (Editor), "40th European Group for Atomic Systems Abstracts", Jul. 2-5, 2008, pp. 1-265, Publisher: European Phsyical Society.

Faxvog et al., "Pulse Velocity and Mode Pulling in a Laser With Equally Spaced Modes", "Journal of Applied Physics", Dec. 1, 1969, pp. 2457-2458, vol. 41, No. 6, Publisher: American Institute of Physics.

Faxvog et al., "Measured Pulse Velocity Greater Than c in a Neon Absorption Cell", "Applied Physics Letters", Jun. 1, 1970, pp. 192-193, vol. 17, No. 5.

"The Frazier Model 100 Iodine Stabilized Helium Neon Laser System", "Published at least as early as Jun. 4, 2010; http://frazierinstrument.com/products/fisl/fisl.html", Accessed: Jun. 4, 2010, pp. 1-2, Publisher: Frazier Precision Instrument Company, Inc.

Gamidov et al., "Influence of Saturation Beam Parameters on Laser Frequency Locked to the Cesium Cycling Transition", "1995 IEEE International Frequency Control Symposium", May 31-Jun. 2, 1995, pp. 149-152, Publisher: IEEE.

Hobbs, "Ultrasensitive Laser Masurements Without Tears", "Applied Optics", Feb. 1, 1997, pp. 903-920, vol. 36, No. 4, Publisher: Optical Society of America.

"Iodine Stabilized Helium-Neon Laser", "Published at least as early as Jun. 4, 2010; http://museum.nist.gov/object.asp?ObjID=50", Accessed: Jun. 4, 2010, pp. 1-2, Publisher: National Institute of Standards and Technology.

Karapetyan, "Advanced Configuration of Gravitational-Wave Interferometer on the Base of 'Sensitive Mode' in 'White-Light Cavity'", "Optics Communications 219 (2003)", Jul. 11, 2002, pp. 335-340, Publisher: Elsevier Science B.V.

Kohel et al., "Quantum Gravity Gradiometer Development for Space", "http://esto.nasa.gov/conferences/ESTC2006/papers/b4p1.pdf", Jun. 28, 2006, pp. 1-7.

Ku, "Slow Light in Semiconductor Heterostructures", "Journal of Physics D: Applied Physics", Feb. 16, 2007, pp. R93-R107, vol. 40, No. 5, Publisher: IOP Publishing Ltd.

Li, "Fast Light in Silicon Ring Resonator With Resonance-Splitting", "Optics Express,", Jan. 13, 2009, pp. 933-940, vol. 17, No. 2, Publisher: Optical Society of America.

Pati et al., "Demonstration of Displacement-Measurement-Sensitivity Proportional to Inverse Group Index of Intra-Cavity Medium in a Ri", "Optics Communications 281 (2008)", Jun. 24, 2008, pp. 4931-4935, Publisher: Elsevier B.V.

Pati, "Simultaneous Slow and Fast Light Effects Using Probe Gain and Pump Depletion Via Raman Gain in Atomic Vapor", "Optics Express", May 11, 2009, pp. 8775-8780, vol. 17, No. 11, Publisher: The Optical Society.

Pati et al., "Simultaneous Slow and Fast Light Effects Using Probe Gain and Pump Depletion Via Raman Gain in Atomic Vapor", 2008, pp. 1-6, Publisher: Optical Society of America.

Pati et al., "Demonstration of a Tunable-Bandwidth White Light Interferometer using Anomalous Dispersion in Atomic Vapor", Sep. 2, 2007, pp. 1-15, Publisher: Northwestern University.

Pati et al., "Simultaneous Generation of Slow and Fast Light for Raman Coupled Beams", "Advances in Slow and Fast Light", Jan. 2008, pp. 69040L-1 thru 69040L-7, vol. 6904, Publisher: SPIE.

Phillips, "Spatially-Resolved Temperature Diagnostic for Supersonic Flow Using Cross-Beam Doppler-Limited Laser Saturation Spectros", Mar. 2006, pp. 1-185, Publisher: Air Force Institute of Technology, Published in: Wright-Patterson Air Force Base, Ohio.

Rabeendran, "A Study of Ring Laser Gyroscopes", 2008, pp. i-88, Publisher: University of Canterbury.

Rinkleff et al., "The Concept of White Light Cavities Using Atomic Phase Coherence", "Physica Scripta", Aug. 20, 2004, pp. 85-88, vol. T118, Publisher: Physica Scripta.

Salit, "Intracavity Fast Light for Rotation Sensing and Gravitational Wave Detection", Jun. 2009, pp. 1-221, Publisher: ProQuest LLC.

Salit et al., "Fast-Light for Astrophysics: Super-Sensitive Gyroscopes and Gravitational Wave Detectors", "Journal of Modern Optics", Nov. 10-20, 2007, pp. 2425-2440, vol. 54, No. 16-17, Publisher: Taylor & Francis.

Schaar, "Theorectical Description and Design of a Fast-Light Enhanced Helium-Neon Ring Laser Gyroscope", Jan. 23, 2011.

Shahriar et al., "Ultrahigh Enhancement in Absolute and Relative Rotation Sensing Using Fast and Slow Light", "Available at http://arxiv.org/ftp/quant-ph/papers/0505/0505192.pdf accessed Aug. 5, 2010", Jul. 17, 2005, pp. 1-10, Publisher: The American Physical Society.

Shahriar et al., "Ultrahigh Precision Absolute and Relative Rotation Sensing Using Fast and Slow Light", "Quantum Information Technology", Oct. 23, 2002, pp. 1-28, Publisher: MIT.

Shahriar et al., "Application of Fast-Light in Gravitational Wave Detection with Interferometers and Resonators", "Journal of Modern Optics", Nov. 10-20, 2008, pp. 3133-3147, vol. 55, No. 19-20, Publisher: Taylor & Francis.

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf; Published at least as early as Aug. 5, 2010", 2005, pp. 1-5, Publisher: Northwestern University.

Shariar et al., "Ultrahigh Precision Absolute and Relative Rotation Sensing using Fast and Slow Light, Version 1", "Available at http://arxiv.org/pdf/quant-ph/0505192v1", May 2005, pp. 1-6, Publisher: arXiv.org.

Shariar et al., "Ultrahigh Precision Absolute and Relative Rotation Sensing using Fast and Slow Light, Version 2", "Available at http://arxiv.org/pdf/quant-ph/0505192v2", Jul. 2005, pp. 1-11, Publisher: arXiv.org.

Shariar et al., "Ultrahigh Precision Absolute and Relative Rotation Sensing using Fast and Slow Light, Version 3", "Available at http://arxiv.org/pdf/quant-ph/0505192v3", Oct. 2006, pp. 1-24, Publisher: arXiv.org.

Shariar et al.,, "Ultrahigh Precision Absolute and Relative Rotation Sensing using Fast and Slow Light, Version 4", "Available at http://arxiv.org/pdf/quant-ph/0505192v4", Feb. 2007, pp. 1-28, Publisher: arXiv.org.

(56) References Cited

OTHER PUBLICATIONS

Shariar et al., "Ultrahigh Precision Absolute and Relative Rotation Sensing using Fast and Slow Light, Version 5", "Available at http://arxiv.org/pdf/quant-ph/0505192v5", Mar. 2007, pp. 1-28, Publisher: arXiv.org.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Smith et al., "Dispersion-enhanced Laser Gyroscope", "available at http://ntrs.nasa.gov/archive/nasa/casi.ntrs.nasa.gov/20090019025_2009016480.pdf accessed Aug. 5, 2010", Jun. 16, 2008, pp. 1-9, Publisher: NASA.

Smith et al., "Dispersion-enhanced laser gyroscope", "Physical Review A", Nov. 20, 2008, pp. 053824-1 thru 053824-9, vol. 78, No. 053824, Publisher: The American Physical Society.

Solimeno et al., "Gain Saturation and Output Power of Distributed Feedback Lasers", "Study of Distributed Feedback Lasers", Aug. 1976, pp. 1309-1321, vol. 9, No. 8, Published in: Great Britain.

Terrel, "Ring-Coupled Mach-Zehnder Interferometer Optimized for Sensing", "Applied Optics", Sep. 1, 2009, pp. 4874-4879, vol. 48, No. 26, Publisher: Optical Society of America.

Terrel, "Coupled Resonator Gyroscopes: What Works and What Does Not", "Advances in Slow and Fast Light III", Jun. 24, 2010, pp. 1-9, vol. 7612, Publisher: SPIE.

Tripathi et al., "Experimental Constraints of Using Slow-Light in Sodium Vapor for Light-Drag Enhanced Relative Rotation Sensing", "Optics Communications", Oct. 15, 2006, pp. 604-608, vol. 266, No. 2, Publisher: Elsevier B.V.

"Saturated Absorption Spectroscopy—Experiment SAS", "Advanced Physics Laboratory", Apr. 7, 2010, pp. 1-26, Publisher: University of Flordia—Department of Physics.

Salit et al., "Enhanced Ring Laser Gyroscope With Dispersion Controlled Gain Condition", "U.S. Appl. No. 12/755,623, filed Apr. 7, 2010,", , pp. 1-22.

Salit et al., "Increasing the Scale Factor of Gas Laser Based Gyroscopes With an External Gain Saturation Beam", "U.S. Appl. No. 12/851,178, filed Aug. 5, 2010,", , pp. 1-28, Published in: US.

Salit et al., "Neon or Iodine Absorption Enhanced Hene Ring Laser Gyroscope", "U.S. Appl. No. 12/851,856, filed Aug. 6, 2010,", , pp. 1-29.

Wicht et al., "White-Light Cavities, Atomic Phase Coherence, and Gravitational Wave Detectors", "Optics Communications", Jan. 15, 1997, pp. 431-439, vol. 134, Publisher: Elsevier Science B.V.

Wise et al., "Linewidth-Broadened Fabry-Perot Cavities within Future Gravitational Wave Detectors", "Classical and Quantum Gravity", Feb. 12, 2004, pp. S1031-S1036, vol. 21, Publisher: Institute of Physics Publishing.

Yum et al., "Fast-Light in a Photorefractive Crystal for Gravitational Wave Detection", "Optics Express", Dec. 8, 2008, pp. 20448-20456, vol. 16, No. 25, Publisher: Optical Society of America.

* cited by examiner

COUPLED CAVITY DISPERSION ENHANCED RING LASER GYROSCOPE

CROSS-REFERENCE TO RELATED APPLICATIONS

This application is related to the following United States patent applications, all of which are hereby incorporated herein by reference:

U.S. patent application Ser. No. 12/173,777 entitled "AN ENHANCED SCALE FACTOR RING LASER GYROSCOPE" filed on Jul. 15, 2008, and issued as U.S. Pat. No. 7,907,284 on Mar. 15, 2011, and which is referred to herein as the '777 application;

U.S. patent application Ser. No. 12/755,623 entitled "ENHANCED RING LASER GYROSCOPE WITH DISPERSION CONTROLLED GAIN CONDITION" filed on Jul. 15, 2008 and which is referred to herein as the '623 application;

U.S. patent application Ser. No. 12/851,178 entitled "ENHANCED RING LASER GYROSCOPE WITH DISPERSION CONTROLLED GAIN CONDITION" filed on Aug. 5, 2010 and which is referred to herein as the '178 application; and U.S. patent application Ser. No. 12/851,856 entitled "NEON OR IODINE ABSORPTION ENHANCED HENE RING LASER GYROSCOPE" filed on Aug. 6, 2010 and which is referred to herein as the '856 application.

BACKGROUND

Ring laser gyroscopes are navigation instruments used to measure rotation rates about an axis of rotation. A ring laser gyroscope typically includes a closed cavity and at least three mirrors designed to reflect light in a loop. Light travels through the closed cavity in both a clock-wise ("CW") and a counter clock-wise ("CCW") direction. When the ring laser gyroscope is stationary, a beam of light traveling through the cavity in the CW direction has the same frequency as a beam of light traveling through the cavity in the CCW direction.

When the ring laser gyroscope is rotating, the frequency of the CW beam is different than that of the CCW beam. Utilizing the Sagnac effect, the frequency difference between a first beam traveling in the CW direction and a second beam traveling in the CCW direction is calculated. This is called resonant frequency splitting.

The rotation rate of the gyroscope is proportional to the frequency difference between the CW beam and the CCW beam. The constant of proportionality between the resonant frequency splitting and the rotation rate is the scale factor. The scale factor is a scaling constant that determines the amplitude of the difference signal generated at a given rotation rate. The scale factor is normally proportional to the area of the device, so that a tradeoff exists between size and performance. The performance of a ring laser gyroscope depends on its scale factor.

SUMMARY

One embodiment of a ring laser gyroscope discussed herein includes an active cavity containing a gain medium, a first plurality of reflective surfaces coupled to the active cavity, at least one medium excited operable to excite the gain medium, a first passive cavity coupled to the active cavity, a second plurality of reflective surfaces coupled to the first passive cavity, a second passive cavity coupled to the first passive cavity, and a third plurality of reflective surfaces. The first plurality of reflective surfaces includes at least a first reflective surface, a second reflective surface, and a third reflective surface. While a plurality of reflective surfaces is described with respect to exemplary embodiments, a continuous reflective surface (such as is used in a fiber-optic ring laser gyroscope) can also be used. The first reflective surface, the second reflective surface, and the third reflective surface of the first plurality of reflective surfaces are positioned to reflect the light along a path defined in the active cavity between the first plurality of reflective surfaces. The excited gain medium induces first and second laser fields within the cavity, wherein the first laser field travels in a clockwise direction within the active cavity and the second laser field travels in a counter-clockwise direction within the cavity.

The first passive cavity is coupled to the active cavity through the first reflective surface. The first passive cavity is devoid of gain media. The second plurality of reflective surfaces include at least the first reflective surface, a fourth reflective surface, and a fifth reflective surface, wherein the first reflective surface, the fourth reflective surface, and the fifth reflective surface of the second plurality of reflective surfaces are positioned to reflect light along a path defined in the first passive cavity between the second plurality of reflective surfaces.

The second passive cavity is coupled to the first passive cavity through the fourth reflective surface. The second passive cavity is devoid of gain media. The third plurality of reflective surfaces include at least the fourth reflective surface, a sixth reflective surface, and a seventh reflective surface, wherein the fourth reflective surface, the sixth reflective surface, and the seventh reflective surface of the third plurality of reflective surfaces are positioned to reflect light along a path defined in the second passive cavity between the third plurality of reflective surfaces.

The first reflective surface and the fourth reflective surface are partially transmissive such that a first portion of light incident on the first reflective surface is reflected, a second portion of light incident on the first reflected surface is transmitted, a third portion of light incident on the fourth reflective surface is reflected, and a fourth portion of light incident on the fourth reflective surface is transmitted. The second and third cavities induce a frequency dependent phase shift on light traveling through the ring laser gyroscope causing anomalous dispersion of the first and second laser fields passing through the gain medium.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
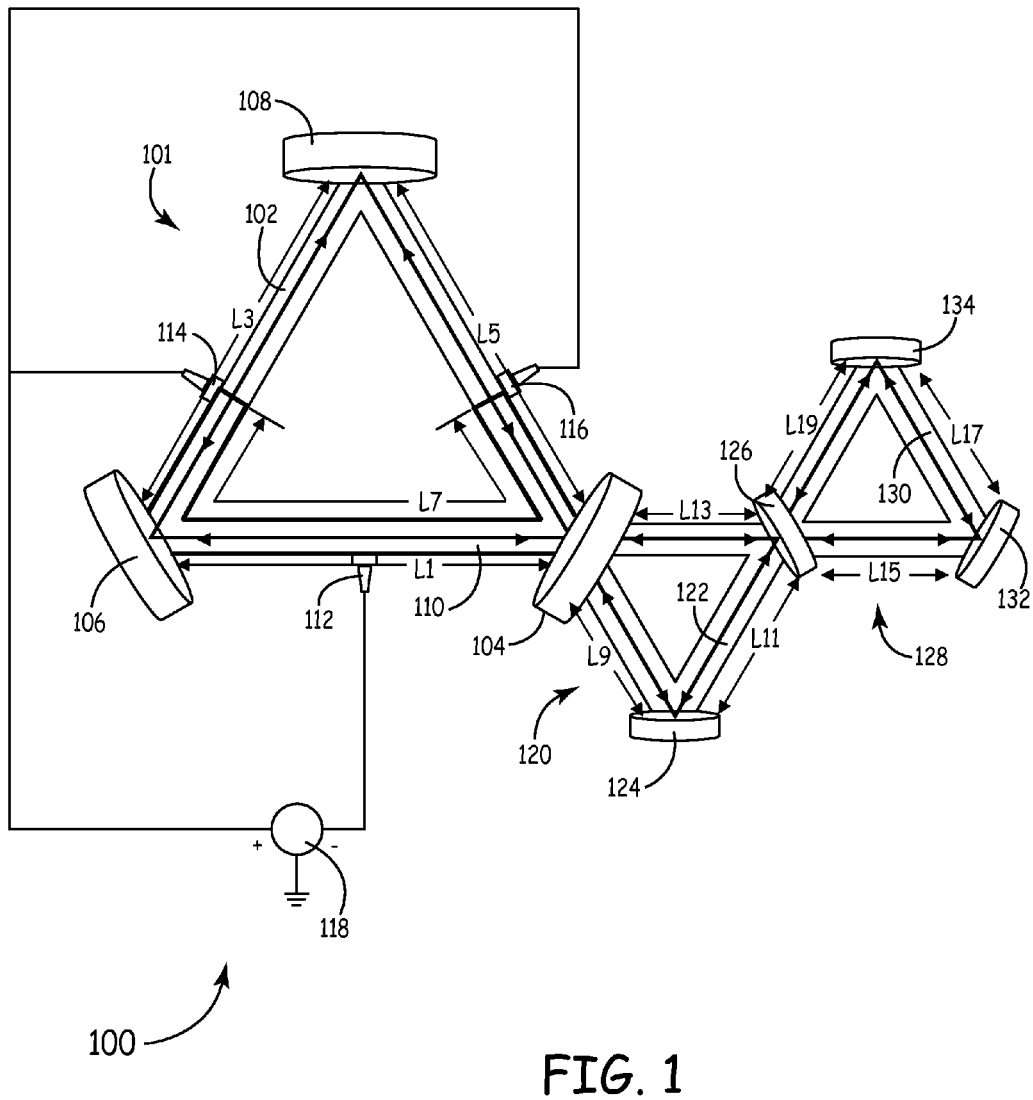
FIG. 1 is a block diagram depicting an exemplary embodiment of a dispersion enhanced ring laser gyroscope having coupled cavities and an enhanced scale factor.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The term "cavity" used herein includes spaces filed with vacuums, air, other gases, or solids. Thus, cavities includes both spaces between mirrors in a ring laser gyroscope and solid core and hollow core fibers. Cavities can be either active cavities that lase (such as laser cavities) or passive cavities that do not lase.

The ring laser gyroscopes described herein increase the scale factor without substantially increasing the area of the device through fast light dispersion. In example gyroscopes described below, an additional frequency dependent phase shift is introduced within a laser cavity. This phase shift is introduced by a plurality of passive cavities coupled to the laser cavity in a series. The plurality of passive cavities cause a change in the reflectivity of the light in the gyroscope. Specifically, light reflected from the passive cavities at the resonant frequency is phase shifted compared to non-resonant reflections. In some embodiments, the phase shift can be close to 180 degrees.

Increasing the scale factor using fast light dispersion allows for miniaturization of navigation grade gyros, enabling a potential cost reduction as well. Increasing the scale factor also reduces the "dead band" in conventional ring laser gyroscopes. This reduction in "dead band" may eliminate the need for a dither motor with associated savings in production costs and reduction in noise. The increase in scale factor without respect to area of the ring laser gyroscope allows the use of ring laser gyroscopes in applications requiring small devices.

FIG. 1 is a block diagram depicting an exemplary fast light ring laser gyroscope 100 having an enhanced scale factor. The gyroscope 100 includes a lasing cavity 101 comprised of an interior cavity 102 filed with a helium-neon ("HeNe") gas. While a HeNe gas is described in this embodiment, other optical gain media can be used in other embodiments. The interior cavity 102 forms an triangle. A first mirror 104 is positioned at a first corner of the triangle. A second mirror 106 is positioned at a second corner of the triangle. A third mirror 108 is positioned at a third corner of the triangle. The length of the cavity 102 between mirror 104 and mirror 106 is L1. The length of the cavity 102 between mirror 106 and mirror 108 is L3. The length of the cavity 102 between mirror 108 and mirror 104 is L5. In other embodiments, the interior cavity 102 forms other shapes and/or greater or fewer mirrors are used in the gyroscope 100.

Figure 6:
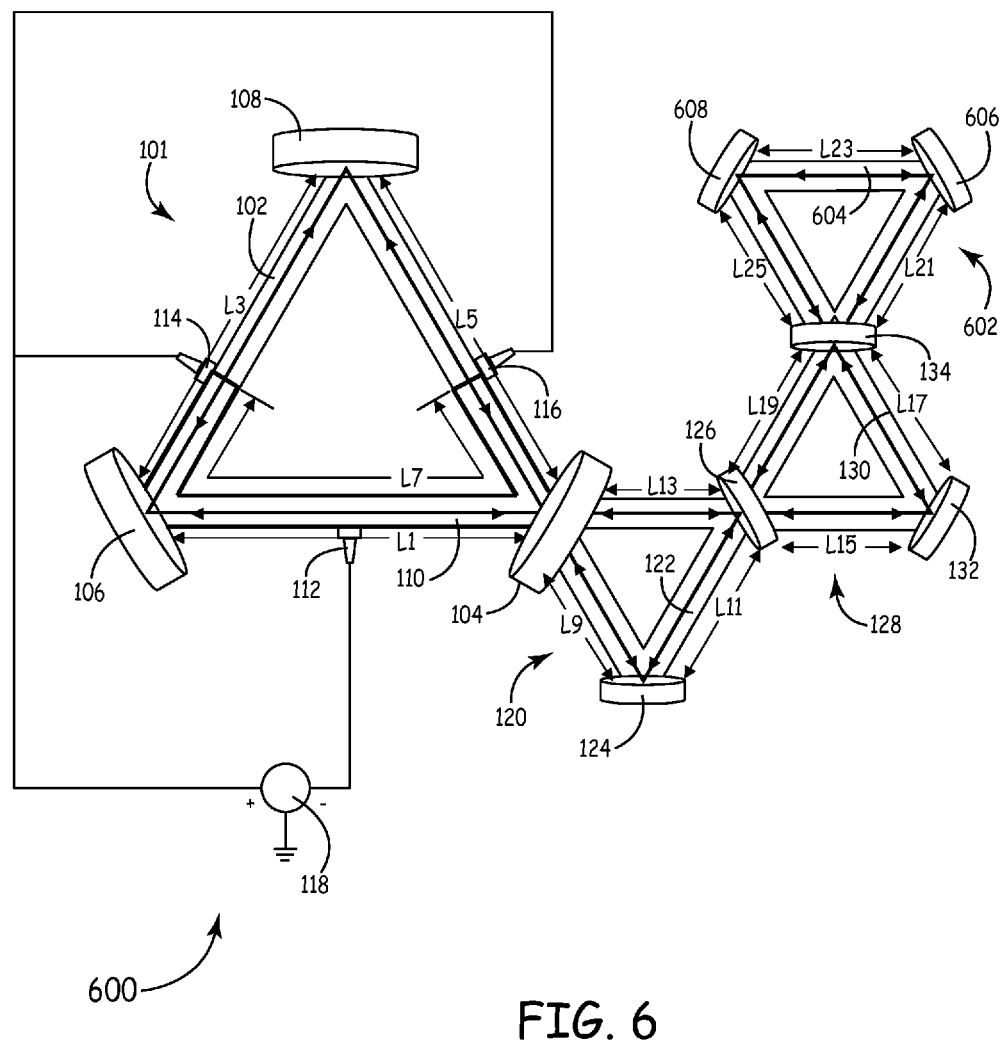
FIG. 6 is a block diagram depicting another exemplary embodiment of a dispersion enhanced ring laser gyroscope having coupled cavities and an enhanced scale factor.
Figure 7:
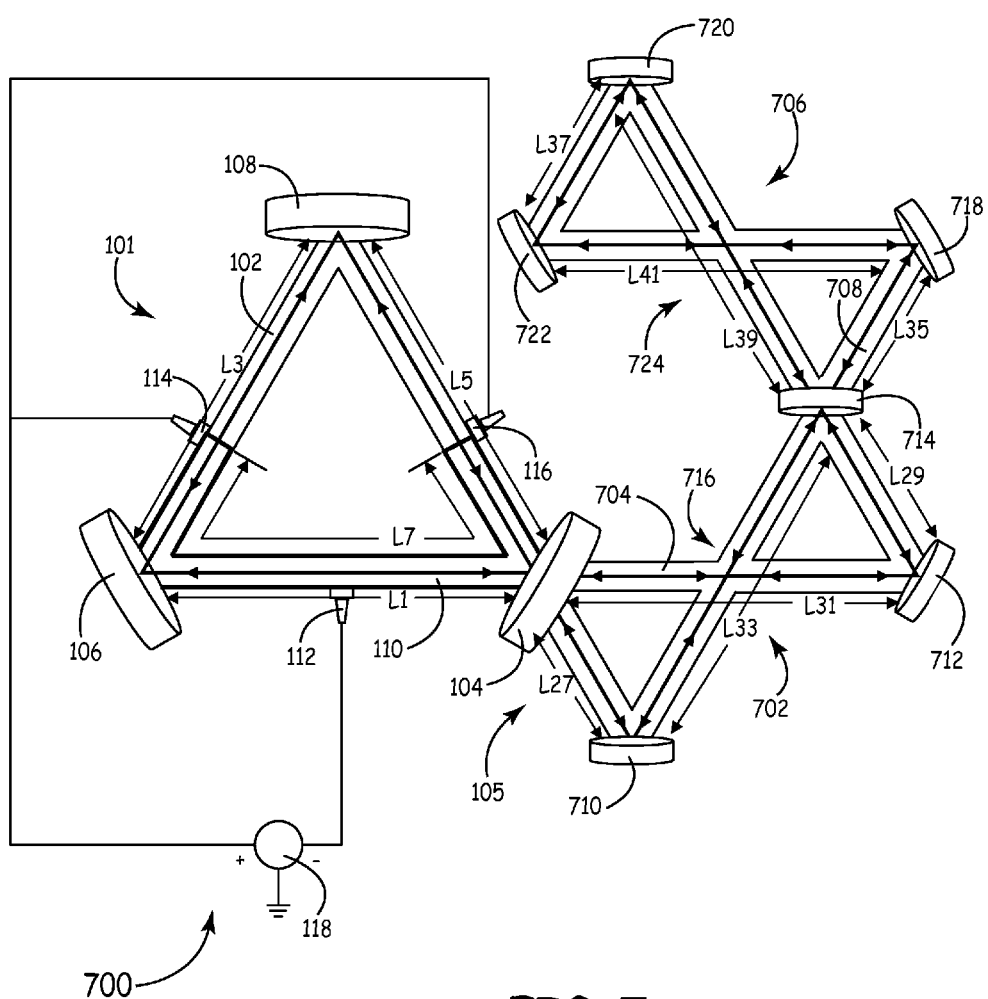
FIG. 7 is a block diagram depicting another exemplary embodiment of a dispersion enhanced ring laser gyroscope having coupled cavities and an enhanced scale factor.
Figure 8:
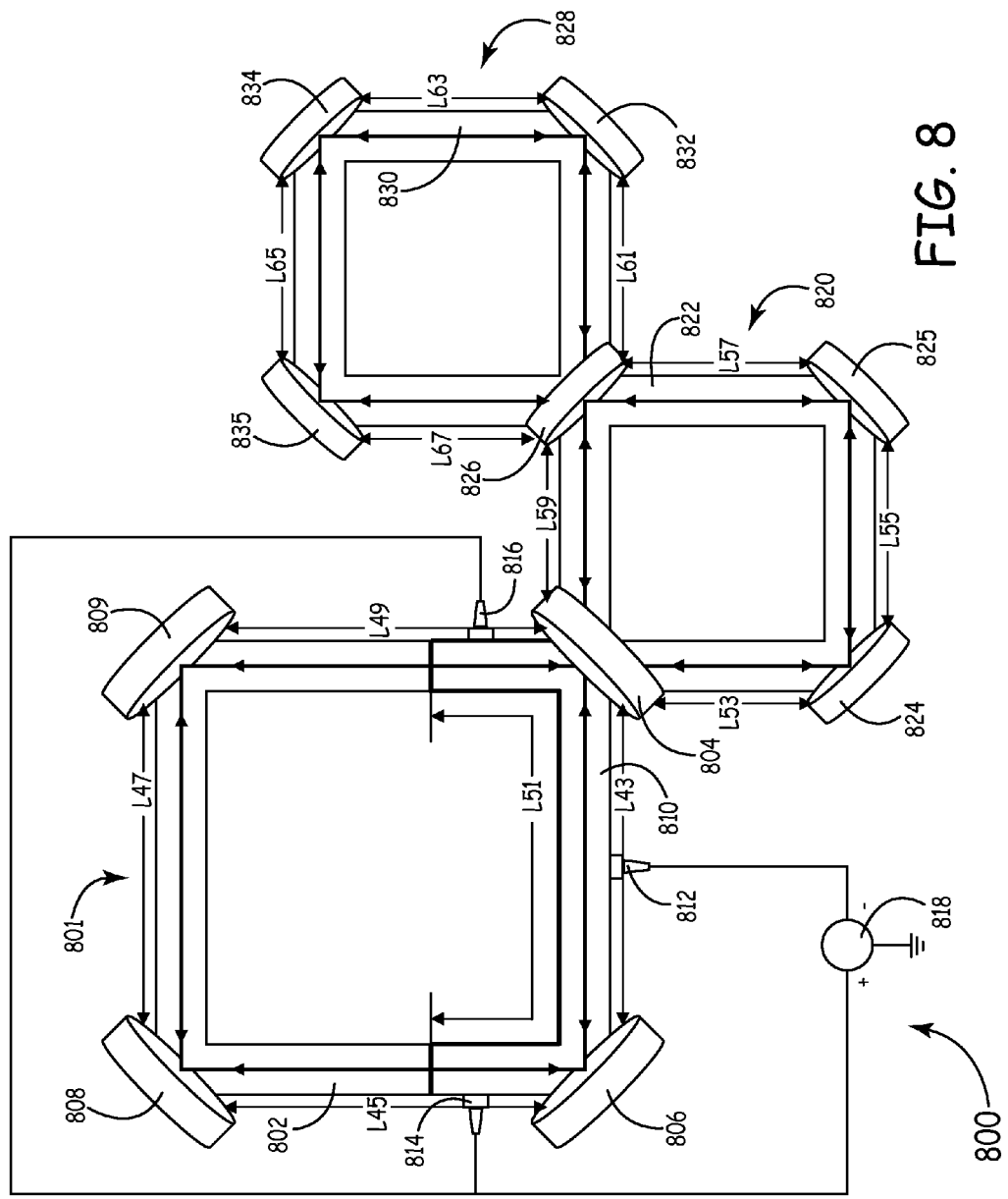
FIG. 8 is a block diagram depicting another exemplary embodiment of a dispersion enhanced ring laser gyroscope having coupled cavities and an enhanced scale factor.

While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscope and should be taken into account. Some additional shapes and quantities of optical cavities are shown in FIGS. 6-8 and described below. In other embodiments, mirrors are not used because the ring laser gyroscope is implemented optical fiber. In these embodiments, the first fiber laser includes the main resonator loop and is coupled to resonators composed of loops of fiber, microspheres, microdisks, or other structures in which the reflective surfaces are continuous rather than discrete, and operate on the principle of total internal reflection. These fiber optic ring laser gyroscopes operate similarly to the ring laser gyroscopes described herein, but the cavities are formed with coiled optical fiber instead of a cavity between mirrors. Instead of transmitting portions of light through the mirror between the various cavities, light is coupled between the active cavity and the passive cavities using evanescent coupling.

A portion of HeNe gas in the cavity 102 of length L7 is converted into a gain medium 110 by exciting the helium and neon atoms. The gain medium 110 in gyroscope 100 fills all of the cavity 102 between mirror 104 and mirror 106 in addition to portions of the cavity 102 between mirror 106 and mirror 108 and portions of the cavity 102 between mirror 104 and mirror 108. While length L7 spans the entire length L1 and portions of length L3 and L5 in the example embodiment, it can be shorter or longer in other embodiments. The helium and neon atoms are excited by inducing a current across the length L7. The current is induced using electrode 112, electrode 114, and electrode 116 powered by a power source 118. The power source 118 applies a current between electrode 112 and electrode 114 and electrode 116. In one non-limiting exemplary embodiment, electrode 112 is a cathode, electrode 114 is an anode, and electrode 116 is an anode. In other embodiments, different amounts of either cathodes, anodes, or both are included. The portion of the HeNe gas is thus excited into the gain medium 110 using a medium excited including electrode 112, electrode 114, and electrode 116. The excited helium atoms collide with the neon atoms which produce fluorescence and stimulated emission.

The gain medium 110 produces and subsequently amplifies light that propagates in both the CW and CCW directions through the cavity 102 of the gyroscope 100 along a path defined in the cavity between mirror 104, mirror 106, and mirror 108. The light propagating through the cavity 102 of the gyroscope 100 constructively interferes with itself to create two counter rotating beams, one traveling in the CW direction and the other traveling in the CCW direction, both with a wavelength of approximately 633 nanometers, in this example, while the gyroscope 100 is stationary. These beams are also sometimes referred to by other names, such as laser fields, light fields, or laser beams. Light from both of the beams is tapped off through one or more of the mirrors and the light from the CW beam is interfered with light from the CCW beam to determine the frequency difference between the CW and CCW beams. To avoid confusion in the drawings, the structure for tapping and interfering the two laser beams is not shown. The tapping-off of the laser beams occurs pursuant to established procedures. In other embodiments, different amounts of electrodes or other methods and medium exciters are used to excite the gain medium in the cavity 102. For example, in some embodiments optical pumping is used to excite a crystalline solid gain medium. Components and methods used for optical pumping are known to one having skill in the art.

The gyroscope 100 also includes a first optical resonator 120 coupled to the interior cavity 102 through the first mirror 104. The first optical resonator 120 includes a first passive optical cavity 122. Passive optical cavities, such as first passive optical cavity 122 and second optical cavity 130 described below, are cavities that are approximately devoid of a gain medium. Thus, the first passive optical cavity 122 does not include a gain medium. In some implementations, the first passive optical cavity 122 is filed with a vacuum. In other embodiments, the first passive optical cavity 122 is filled with a gas that does not interact with the light generated by the gain medium 110 of the first interior cavity 102. The first passive optical cavity 120 forms an triangle, in this example. The first mirror 104 is positioned at a first corner of the triangle formed by the first passive optical cavity 122. A fourth mirror 124 is positioned at a second corner of the triangle formed by the first passive optical cavity 122. A fifth mirror 126 is positioned at a third corner of the triangle formed by the first passive optical cavity 120. While a plurality of reflective surfaces is described with respect to exemplary embodiments, a continuous reflective surface (such as is used in a fiber-optic ring laser gyroscope) can also be used to implement the first optical resonator 120.

The length of the first passive optical cavity 122 between mirror 104 and mirror 124 is L9. The length of the first passive optical cavity 122 between mirror 124 and mirror 126 is L11. The length of the first passive optical cavity 122 between mirror 126 and mirror 104 is L13. In other embodiments, the first passive optical cavity 122 forms other shapes and/or greater or fewer mirror are used in the gyroscope 100. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscope and should be taken into account. Some additional shapes and quantities of passive optical cavities are shown in FIGS. 6-8 and described below.

The gyroscope 100 also includes a second optical resonator 128 coupled to the first optical resonator 120 through the fifth mirror 126. The second optical resonator 128 includes a second passive optical cavity 130. As indicated above, passive optical cavities, such as first passive optical cavity 122 and second optical cavity 130, are cavities that are approximately devoid of a gain medium. Thus, the second passive optical cavity 130 does not include a gain medium. In some implementations, the second passive optical cavity 130 is filed with a vacuum. In some implementations, the second passive optical cavity 130 is filled with a gas that does not interact with the light generated by the gain medium 110 of the first interior cavity 102. The second passive optical cavity 130 forms an triangle, in this example. The fifth mirror 126 is positioned at a first corner of the triangle formed by the second passive optical cavity 130. A sixth mirror 132 is positioned at a second corner of the triangle formed by the second passive optical cavity 130. A seventh mirror 134 is positioned at a third corner of the triangle formed by the second passive optical cavity 130. While a plurality of reflective surfaces is described with respect to exemplary embodiments, a continuous reflective surface (such as is used in a fiber-optic ring laser gyroscope) can also be used to implement the second optical resonator 128.

The length of the second passive optical cavity 130 between mirror 126 and mirror 132 is L15. The length of the second passive optical cavity 130 between mirror 132 and mirror 134 is L17. The length of the second passive optical cavity 130 between mirror 134 and mirror 126 is L19. In other embodiments, the second passive optical cavity 130 forms other shapes and/or greater or fewer mirrors are used in the gyroscope 100. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscopes and should be taken into account. Some additional shapes and quantities of passive optical cavities are shown in FIGS. 6-8 and described below.

Both first passive optical cavity 122 and second passive optical cavity 130 are frequency-dependent phase shifters. The light reflected from either first passive optical cavity 122 or second passive optical cavity 130 experiences a phase shift of up to 180 degrees for light on or near resonance. Reflected light in this context includes both light transmitting out of either first passive optical cavity 122 or second passive optical cavity 130 and the incident light that did not couple into the resonator. The light transmitted out of the cavity interferes with the incident light that did not couple into the resonator, with the sum equaling the total reflected field.

Thus, the reflectivity caused by each passive optical cavity, such as first passive optical cavity 122 and second passive optical cavity 130, can be calculated as described below. Initial assumptions of plane wave light fields and bulk-optic mirrors are simplified in the calculations below. The calculations below are generalized for a passive ring cavity with m mirrors. Thus, m equals three in the case of three mirrored passive optical cavities, such as first passive optical cavity 122 and second passive optical cavity 130.

Generally, an input field $E_0 e^{i\omega t}$ transmits through an input mirror with transmissivity $t_1$ and reflectivity $r_1$. The input field $E_0 e^{i\omega t}$ propagates a total distance L, comprising the length of one trip around the passive optical cavity, such as passive optical cavity 122 or passive optical cavity 130. While propagating through the cavity, the input field $E_0 e^{i\omega t}$ reflects from mirrors of reflectivity $r_2$, $r_3$, etc. until returning to the input mirror having reflectivity $r_1$. The amplitude of the input field $E_0 e^{i\omega t}$ is reduced by some factor "s" due to losses through one round trip through the passive optical cavity.

After one round trip around the passive optical cavity, the field traveling through the passive optical cavity will be given by the equation:

$$E_1 = \frac{E_0 t_1 \prod_{p=1}^{m} r_p s e^{i\omega t - ikL}}{r_1}.$$

The field $E_1$ then reflects from the input mirror and propagates around the ring cavity again, so that its amplitude is again multiplied by the product of the reflectivities of all of the mirrors and an additional $e^{-ikL}$ propagation term is added to the phase. After N trips around, the field will be given by the equation:

$$E_N = \frac{E_0 t_1 e^{-i\omega t} \left( \prod_{p=1}^{m} r_p s e^{-ikL} \right)^N}{r_1}.$$

As new light is continuously fed in from the counter rotating beams induced by the excited gain medium, light which has completed one round trip is added to light which has completed two, three, or more round trips, so that the total field, in the limit of continuous waves, is given by $$E_{int} = \sum_{N=1}^{\infty} E_N,$$

which can be written in the form of a geometric series which sums to the equation:

$$E_{int} = \frac{\dfrac{E_0 t_1 e^{-i\omega t} \prod_{p=1}^{m} r_p s e^{-ikL}}{r_1}}{1 - \prod_{p=1}^{m} r_p s e^{-ikL}}.$$

This equation represents the total field at the location of the input mirror and just inside it. A fraction $t_1$ of this light transmits out through the input mirror (also referred to as the input coupler) and overlaps with the light which has reflected directly from that input mirror. In some embodiments where the reflecting surface of the input mirror is faced toward the interior of the cavity, a $\pi$ phase shift is applied to the reflected light. This directly reflected light has amplitude given by reflected electric field $E_{ref} = r_1 E_0 e^{i\omega t + i\pi}$.

The total field, including the transmitted amplitude of the internal cavity field and the immediately reflected light, can be divided by the input field to give a net reflectivity for the cavity (as opposed to just the input mirror) in steady-state:

$$r_{cav} = \frac{E_{tot}}{E_0 e^{-i\omega t}} = \frac{\dfrac{t_1^2 \prod_{p=1}^{m} r_p s e^{-ikL}}{r_1}}{1 - \prod_{p=1}^{m} r_p s e^{-ikL}} - r_1.$$

This reflectivity is a complex number, with its magnitude determining the amplitude of the reflected field, and its phase determining the phase shift imparted on the light. If a second passive cavity is coupled to the first cavity such that it forms one of the mirrors (such as passive optical cavity 130 being coupled to passive optical cavity 122), its reflectivity is given by the same general expression above. Thus, the reflectivity of the second passive cavity (such as passive optical cavity 130) is substituted into the equation for the reflectivity of the first passive cavity (such as passive optical cavity 122), as below (where Greek letters have replaced the corresponding Latin characters in variable names for the transmissivity, reflectivity, and length of the second passive cavity):

$$r_{cav\text{-}coupled} = \frac{\left( \dfrac{t_1^2 \dfrac{\tau_1^2 \prod_{q=1}^{n} \rho_q \sigma e^{-ikL_2}}{r_2}}{1 - r_2 \prod_{q=1}^{m} \rho_q \sigma e^{-ikL_2}} - r_2 \right) \prod_{p=3}^{m} r_p s e^{-ikL}}{1 - \left( \dfrac{\dfrac{\tau_1^2 \prod_{q=1}^{n} \rho_q \sigma e^{-ikL_2}}{r_2}}{1 - r_2 \prod_{q=1}^{n} \rho_q \sigma e^{-ikL_2}} - r_2 \right) r_1 \prod_{p=3}^{m} r_p s e^{-ikL}} - r_1$$

Although the preceding equation is included for clarity, some example embodiments do not implement the equation represented above. Thus, this and the other equations are merely representations of how some embodiments may be implemented and are not limiting of the claim scope. For example, the equations for other reflective structures, such as Bragg Gratings, or for optical fibers, would be similar, but not exactly the same.

The phase shift on reflection from this double-coupled-cavity structure is given by:

$$\phi_{cav\text{-}coupled} = \tan^{-1}\left( \frac{\text{Im}[r_{cav\text{-}coupled}]}{\text{Re}[r_{cav\text{-}coupled}]} \right).$$

While dispersion associated with the reflection may be either normal or anomalous, anomalous dispersion is desired for scale factor enhancement.

Since the phase varies more slowly with frequency than in free space, the resonant frequencies will differ from the gain center frequency 208 by a greater amount. The factor by which the frequency shifts with rotation rate is thus enhanced. This factor is known as the scale factor because it is generally proportional to the size of the device. The properties (such as the reflectivity, transitivity, and attenuation) of the first optical cavity 122 and the second optical cavity 130 are adjusted to achieve the desired scale factor.

Figure 2:
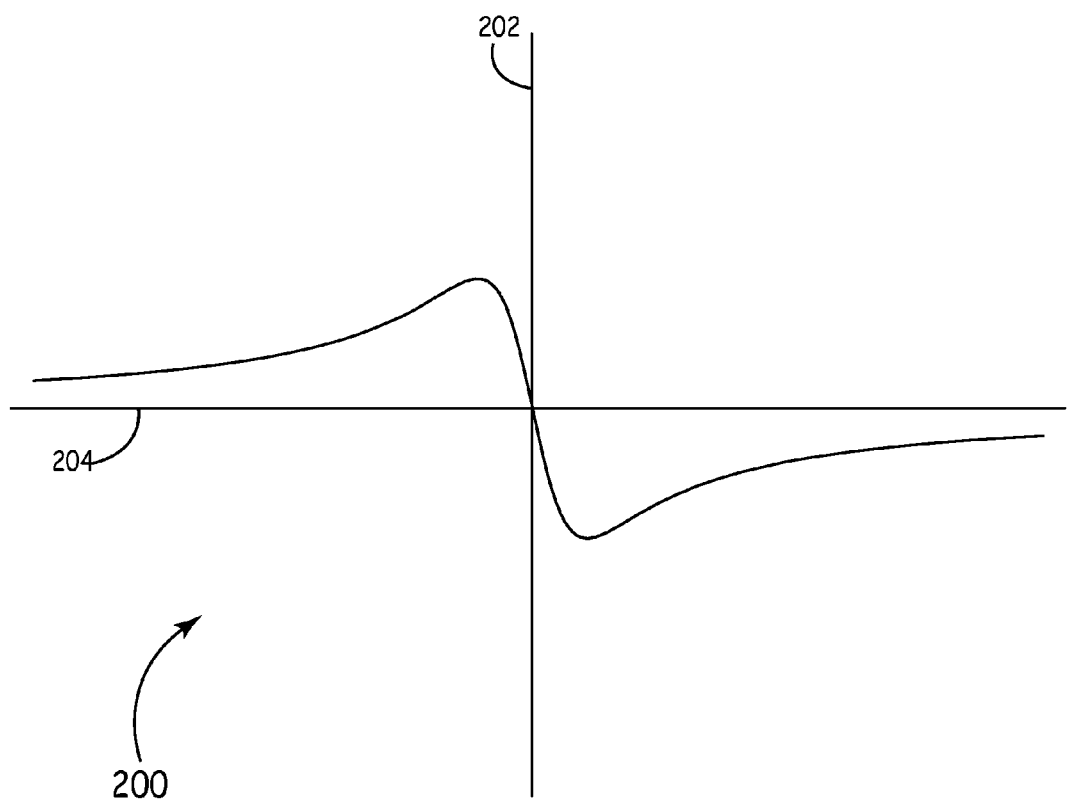
FIG. 2 shows an exemplary graph of a phase shift on reflection from the exemplary embodiment of the dispersion enhanced ring laser gyroscope of FIG. 1.

FIG. 2 shows an exemplary graph 200 of the phase shift on reflection from the coupled cavity system used in the example gyroscope 100. The phase is shown on the Y axis 202 (in radians) as a function of the optical frequency offset from the shared resonance shown on the X axis 204 (in radians per second (rad/sec)). Graph 200 is centered on the Y axis 202 around zero radians per second and centered on the X axis 204 around zero radians. Graph 200 assumes that both passive cavities (such as passive optical cavity 122 and passive optical cavity 130 in gyroscope 100) share the same resonant frequency. The condition for scale factor enhancement is $$0 > \frac{d\phi_{cav\text{-}coupled}}{d\omega} > -\frac{L}{c},$$

where L is the length of the active primary cavity. This condition constrains the acceptable values for the reflectivities of the various reflective surfaces and the length of the passive cavities. When this condition is met, the round-trip phase for light propagating in the active cavity varies less with frequency than it would in free space.

Figure 3:
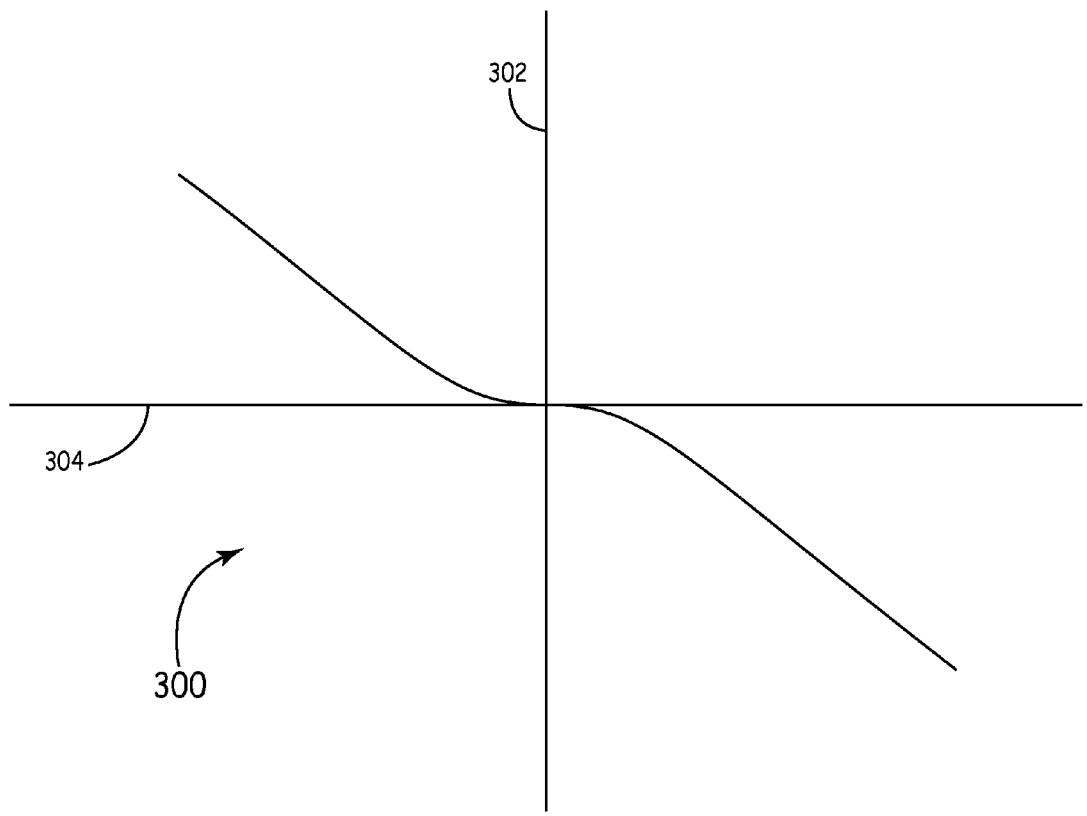
FIG. 3 shows an exemplary graph of a round-trip phase shift from the exemplary embodiment of the dispersion enhanced ring laser gyroscope of FIG. 1.

FIG. 3 shows an exemplary graph 300 of the round-trip phase shift from the coupled cavity system used in the example gyroscope 100. The round-trip phase shift is shown on the Y axis 302 (in radians) as a function of the optical frequency offset from the shared resonance shown on the X axis 304 (in radians/second). Graph 300 is centered on the Y axis 302 around zero radians per second and centered on the X axis 304 around zero radians. Graph 300 assumes a propagation phase of the form $$\phi = -\frac{\omega L}{c}$$

in the remainder of the active cavity.

In addition to the constraints described above, the net reflectivity of the coupled-cavity system (such as the combination of passive optical cavity 122 and passive optical cavity 130 in gyroscope 100) under operating conditions must be sufficient for the primary active cavity (such as lasing cavity 101) to operate as a laser. Because the anomalous dispersion associated with reflection from a resonator occurs at a minimum of the reflected power, a relatively small amount of reflected power on resonance is used to obtain a desirable relatively steep dispersion. If the reflected power on resonance becomes too small, the laser may stop lasing. In order to overcome this problem, two or more separate passive optical cavities are used, such as first optical cavity 122 and second optical cavity 130. The coupled cavity system has a higher reflectivity when both cavities are on resonance than either does alone, for the same associated phase change with frequency.

Figure 4:
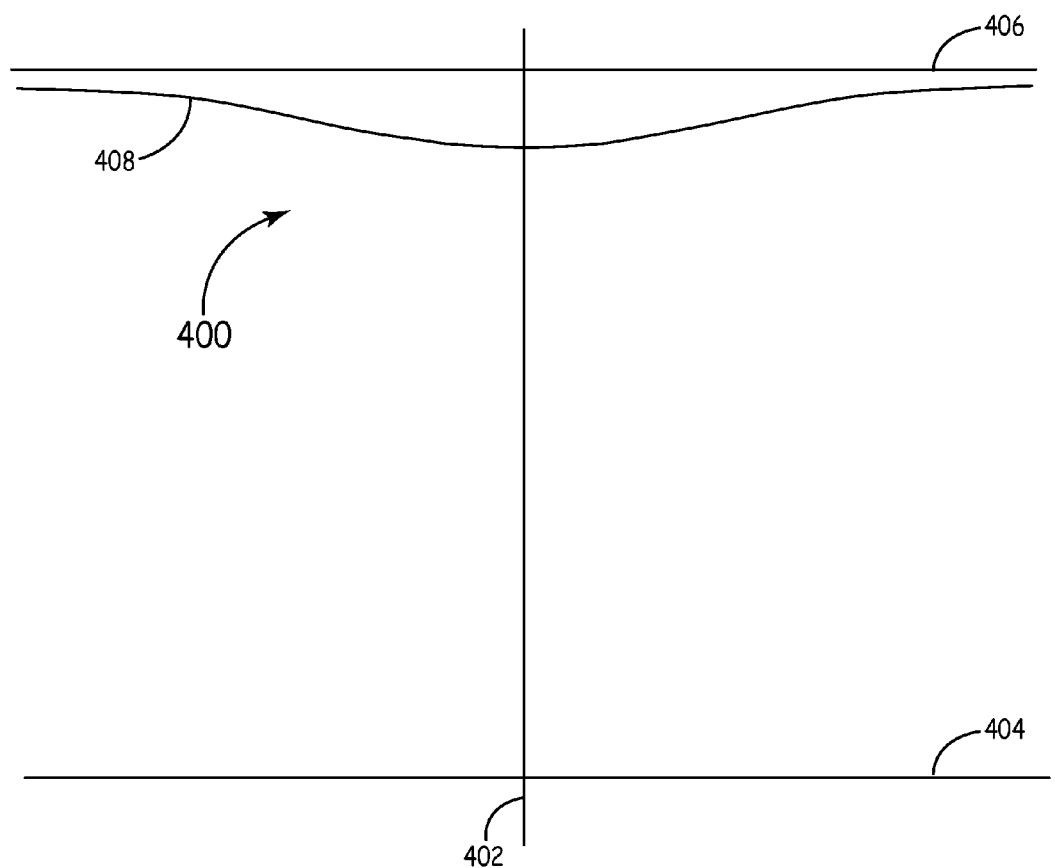
FIG. 4 shows an exemplary graph of the fraction of input intensity which is reflected in the exemplary embodiment of the dispersion enhanced ring laser gyroscope of FIG. 1.

FIG. 4 shows an exemplary graph 400 of the fraction of input intensity which is reflected in the example gyroscope 100. The fraction of input intensity that is reflected is shown on the Y axis 402 (as a decimal number between zero and one) as a function of the optical frequency offset from the shared resonance shown on the X axis 404 (in radians/second). The X axis 404 of graph 400 is at zero and the top dotted line 406 is at 1.00. Everything between the X axis 404 and the top dotted line 406 is a fraction between zero and 1.00. The Y axis is centered at zero radians per second. Plot 408 is a plot of the fraction of input intensity which is reflected in the example gyroscope 100 by the combination of the first passive optical cavity 122 and the second passive optical cavity 130.

Figure 5:
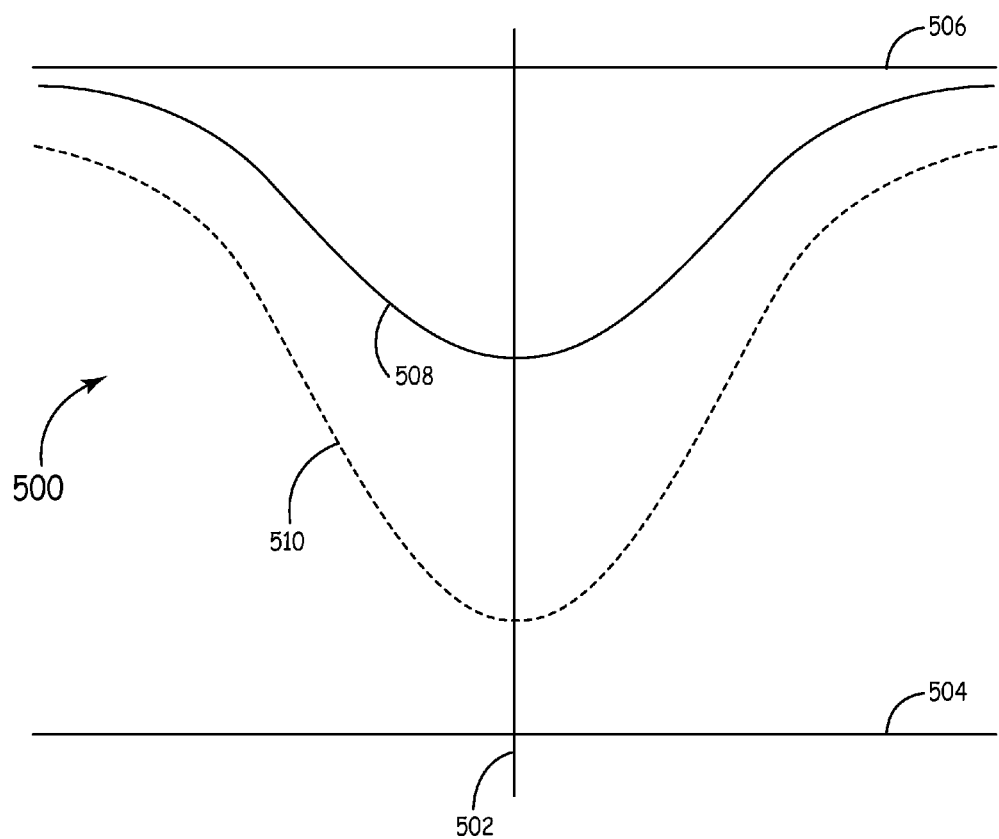
FIG. 5 shows an exemplary graph of the fraction of input intensity which is reflected by each of the individual passive cavities in the exemplary embodiment of the dispersion enhanced ring laser gyroscope of FIG. 1.

FIG. 5 shows an exemplary graph 500 of the fraction of input intensity which is reflected by each of the individual passive cavities in the example gyroscope 100. The fraction of input intensity that is reflected is shown on the Y axis 502 (as a decimal number between zero and one) as a function of the optical frequency offset from the shared resonance for the individual passive cavities (such as first optical cavity 122 and/or second optical cavity 130) shown on the X axis 504 (in radians/second). The X axis 504 of graph 500 is at zero and the top dotted line 506 is at 1.00. Everything between the X axis 504 and the top dotted line 406 is a fraction between zero and 1.00. The Y axis is centered at zero radians per second. Plot 508 is a plot of the fraction of input intensity which is reflected by the first passive optical cavity 122 and plot 510 is a plot of the fraction of input intensity which is reflected by the second passive optical cavity 130. Thus, it is clear that the fraction of the input intensity reflected by either the first passive optical cavity 122 or second passive optical cavity 130 alone is low around the resonant frequency (FIG. 5) compared to the combined input intensity of the combined first passive optical cavity 122 and second passive optical cavity 130 (FIG. 4).

While much of the two counter-rotating beams present in the first interior cavity 102 are reflected by mirror 104, some of each of the two counter-rotating beams is transmitted through mirror 104 and into the first passive optical cavity 122. Thus, the two counter-rotating beams also travel through the first passive optical cavity 122 in CW and CCW directions. While much of the two counter-rotating beams present in the first passive optical cavity 122 are reflected by mirror 126, some of each of the two counter-rotating beams is transmitted through mirror 126 and into the second passive optical cavity 130. Thus, the two counter-rotating beams also travel through the second optical cavity 130 in CW and CCW directions.

From the perspective of the first passive optical cavity 122, the entire second passive optical cavity 130 appears as mirror 126 with a particular frequency dependent reflectivity. Similarly, from the perspective of the first interior cavity 102, the entire first passive optical cavity 122, including the reflectivity of the entire second passive optical cavity, appears as mirror 104 with a particular frequency dependent reflectivity.

The frequency dependence of the reflectivity of the coupled cavity system is related to both the optical power that is reflected in each cavity and the length of the cavities relative to the wavelength of the ring laser gyroscope's counter propagating laser beams. In some embodiments, environmental factors, such as thermal expansion and vibration effects, alter the relevant length and distort the frequency dependence on which the enhancement depends. To compensate for these distortions, some embodiments are actively controlled. Embodiments implementing active control are described below with respect to FIGS. 11-12.

FIG. 6 is a block diagram depicting an exemplary fast light ring laser gyroscope 600 having an enhanced scale factor. The gyroscope 600 includes all the same components as the exemplary fast light ring laser gyroscope 100 of FIG. 1, including the first optical resonator 120 and the second optical resonator 128. Gyroscope 600 operates according to the same principles and methods as gyroscope 100 described above. The common components shared between gyroscope 600 and gyroscope 100 operate according to the description of gyroscope 100 above.

In addition, gyroscope 600 also includes an additional third optical resonator 602 coupled to the second optical resonator 128 through the seventh mirror 134. The third optical resonator 602 includes a third passive optical cavity 604. The third passive optical cavity 604 does not include a gain medium. In some implementations, the third passive optical cavity 604 is filed with a vacuum. In some implementations, the third passive optical cavity 604 is filled with a gas that does not interact with the light generated by the gain medium 110 of the first interior cavity 102. The third passive optical cavity 602 forms an triangle, in this example. The seventh mirror 134 is positioned at a first corner of the triangle formed by the third passive optical cavity 604. An eighth mirror 606 is positioned at a second corner of the triangle formed by the third passive optical cavity 604. A ninth mirror 608 is positioned at a third corner of the triangle formed by the third passive optical cavity 604. While a plurality of reflective surfaces is described with respect to exemplary embodiments, a continuous reflective surface (such as is used in a fiber-optic ring laser gyroscope) can also be used to implement the third passive optical cavity 604.

The length of the third passive optical cavity 604 between mirror 134 and mirror 606 is L21. The length of the third passive optical cavity 604 between mirror 606 and mirror 608 is L23. The length of the fourth passive optical cavity 604 between mirror 608 and mirror 134 is L25. In other embodiments, the third passive optical cavity 604 forms other shapes and/or greater or fewer mirrors are used in the gyroscope 600. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscopes and should be taken into account. Some additional shapes and quantities of passive optical cavities are shown in FIGS. 7-8 and described below.

FIG. 7 is a block diagram depicting an exemplary fast light ring laser gyroscope 700 having an enhanced scale factor. The gyroscope 700 includes the similar components as gyroscope 100 shown in FIG. 1 and described above and operates according to the same principles and methods as gyroscope 100 described above. While gyroscope 700 also only has two optical resonators, the shape of the optical resonators in gyroscope 700 is different from the triangle shape of first optical resonator 120 and second optical resonator 128 shown in FIG. 1. Specifically, gyroscope 700 includes a first hourglass-shaped optical resonator 702 having a first hourglass-shaped passive optical cavity 704 and a second hourglass-shaped optical resonator 706 having a second hourglass-shaped passive optical cavity 708. Such an hourglass-shaped cavity has resonances which are insensitive to rotation of the cavity, which is desirable for scale factor stability.

The first hourglass-shaped passive optical cavity 704 is coupled to the interior cavity 102 through the first mirror 104. The first hourglass-shaped passive optical cavity 704 does not include a gain medium. In some implementations, the first hourglass-shaped passive optical cavity 704 is filed with a vacuum. In some implementations, the first hourglass-shaped passive optical cavity 704 is filled with a gas that does not interact with the light generated by the gain medium 110 of the first interior cavity 102. The first hourglass-shaped passive optical cavity 704 is forms an hourglass shape. The first mirror 104 is positioned at a first corner on a first end of the hourglass formed by the first hourglass-shaped passive optical cavity 704. A fourth mirror 710 is positioned at a second corner on the first end of the hourglass formed by the first hourglass-shaped passive optical cavity 704. A fifth mirror 712 is positioned at a third corner on a second end of the hourglass formed by the first hourglass-shaped passive optical cavity 704. A sixth mirror 714 is positioned at a fourth corner on the second end of the hourglass formed by the first hourglass-shaped passive optical cavity 704. Because of the hourglass shape of the first hourglass-shaped passive optical cavity 704, light crosses paths at the neck 716 of the first hourglass-shaped passive optical cavity 704. In some implementations the crossing of light at the neck 716 does not affect the light crossing at the neck 716 because the first hourglass-shaped passive optical cavity 704 is filed with a vacuum or other gas that does not cause the light to interact with itself when crossing at the neck 716. While a plurality of reflective surfaces is described with respect to exemplary embodiments, a continuous reflective surface (such as is used in a fiber-optic ring laser gyroscope) can also be used to implement the first hourglass-shaped passive optical cavity 704.

The length of the first hourglass-shaped passive optical cavity 704 on the first end between mirror 104 and mirror 710 is L27. The length of the first hourglass-shaped passive optical cavity 704 on the second end between mirror 712 and mirror 714 is L29. The length of the first hourglass-shaped passive optical cavity 704 between the mirror 104 and mirror 712 is L31. The length of the first hourglass-shaped optical cavity 704 between mirror 710 and mirror 714 is L33. In other embodiments, the first hourglass-shaped optical cavity 704 forms a different hourglass shape and/or greater or fewer mirrors are used in the gyroscope 700. While mirror are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscopes and should be taken into account. Some additional shapes and quantities of passive optical cavities are shown in FIG. 8 and described below.

The second hourglass-shaped passive optical cavity 708 is coupled to the first hourglass-shaped passive optical cavity 704 through the sixth mirror 714. The second hourglass-shaped passive optical cavity 708 does not include a gain medium. In some implementations, the second hourglass-shaped passive optical cavity 708 is filed with a vacuum. In some implementations, the second hourglass-shaped passive optical cavity 708 is filled with a gas that does not interact with the light generated by the gain medium 110 of the first interior cavity 102. The second hourglass-shaped passive optical cavity 708 is forms an hourglass shape. The sixth mirror 714 is positioned at a first corner on a first end of the hourglass formed by the second hourglass-shaped passive optical cavity 708. A seventh mirror 718 is positioned at a second corner on the first end of the hourglass formed by the second hourglass-shaped passive optical cavity 708. An eighth mirror 720 is positioned at a third corner on a second end of the hourglass formed by the second hourglass-shaped passive optical cavity 708. A ninth mirror 722 is positioned at a fourth corner on the second end of the hourglass formed by the second hourglass-shaped passive optical cavity 708. Because of the hourglass shape of the second hourglass-shaped passive optical cavity 708, light crosses paths at the neck 724 of the second hourglass-shaped passive optical cavity 708. In some implementations the crossing of light at the neck 724 does not affect the light crossing at the neck 724 because the second hourglass-shaped passive optical cavity 708 is filed with a vacuum or other gas that does not cause the light to interact with itself when crossing at the neck 724. While a plurality of reflective surfaces is described with respect to exemplary embodiments, a continuous reflective surface (such as is used in a fiber-optic ring laser gyroscope) can also be used to implement second hourglass-shaped passive optical cavity 708.

The length of the first hourglass-shaped passive optical cavity 704 on the first end between mirror 104 and mirror 710 is L27. The length of the first hourglass-shaped passive optical cavity 704 on the second end between mirror 712 and mirror 714 is L29. The length of the first hourglass-shaped passive optical cavity 704 between the mirror 104 and mirror 712 is L31. The length of the first hourglass-shaped optical cavity 704 between mirror 710 and mirror 714 is L33. In other embodiments, the first hourglass-shaped optical cavity 704 forms a different hourglass shape and/or greater or fewer mirrors are used in the gyroscope 700. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscopes and should be taken into account. Some additional shapes and quantities of passive optical cavities are shown in FIG. 8 and described below.

The length of the second hourglass-shaped passive optical cavity 708 on the first end between mirror 714 and mirror 718 is L35. The length of the second hourglass-shaped passive optical cavity 708 on the second end between mirror 720 and mirror 722 is L37. The length of the second hourglass-shaped passive optical cavity 708 between mirror 714 and mirror 720 is L39. The length of the second hourglass-shaped passive optical cavity 708 between mirror 718 and mirror 722 is L41. In other embodiments, the second hourglass-shaped optical cavity 708 forms a different hourglass shape and/or greater or fewer mirrors are used in the gyroscope 700. While mirror are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscopes and should be taken into account. Some additional shapes and quantities of passive optical cavities are shown in FIG. 8 and described below.

FIG. 8 is a block diagram depicting an exemplary fast light ring laser gyroscope 800 having an enhanced scale factor. The gyroscope 800 includes the similar components as gyroscope 100 shown in FIG. 1 and described above. Gyroscope 800 operates according to the same principles and methods as gyroscope 100 described above. While gyroscope 800 also only has two optical resonators, the shape of both the lasing cavity and the optical resonators in gyroscope 800 are different from the triangle shape of lasing cavity 101, first optical resonator 120, and second optical resonator 128 shown in FIG. 1. Specifically, gyroscope 800 includes a square lasing cavity 801, a square optical resonator 820, and a square optical resonator 828.

The square lasing cavity 801 of the gyroscope 800 includes an interior cavity 802 filed with a helium-neon ("HeNe") gas. While a HeNe gas is described in this embodiment, other optical gain media can be used in other embodiments. The interior cavity 802 forms a square. A first mirror 804 is positioned at a first corner of the square. A second mirror 806 is positioned at a second corner of the square. A third mirror 808 is positioned at a third corner of the square. A fourth mirror 809 is positioned at a fourth corner of the square. The length of the cavity 802 between mirror 804 and mirror 806 is L43. The length of the cavity 802 between mirror 806 and mirror 808 is L45. The length of the cavity 802 between mirror 808 and mirror 809 is L47. The length of the cavity between mirror 809 and mirror 804 is L49. In other embodiments, the interior cavity 802 forms other shapes (such as rectangles) and/or greater or fewer mirrors are used in the gyroscope 800. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscope and should be taken into account. Some additional shapes and quantities of passive optical cavities are shown in FIGS. 1 and 6-7 and described above.

A portion of HeNe gas in the cavity 802 of length L51 is converted into a gain medium 810 by exciting the helium and neon atoms. The gain medium 810 in gyroscope 800 fills all of the cavity 802 between mirror 804 and mirror 806 in addition to portions of the cavity 802 between mirror 806 and mirror 808 and portions of the cavity 802 between mirror 804 and mirror 809. While length L51 spans the entire length L43 and portions of lengths L45 and L49 in the example embodiment, it can be shorter or longer in other embodiments. The helium and neon atoms are excited by inducing a current across the length L51. The current is induced using electrode 812, electrode 814, and electrode 816 powered by a power source 818. The power source 818 applies a current between electrode 812 and electrode 814 and electrode 816. In one non-limiting exemplary embodiment, electrode 812 is a cathode, electrode 814 is an anode, and electrode 816 is an anode. In other embodiments, different amounts of either cathodes, anodes, or both are included. The portion of the HeNe gas is thus excited into the gain medium 810 using a medium excited including electrode 812, electrode 814, and electrode 816. The excited helium atoms collide with the neon atoms which produce fluorescence and stimulated emission.

The gain medium 810 induces light that propagates in both the CW and CCW directions through the cavity 802 of the gyroscope 800 along a path defined in the cavity 802 between mirror 804, mirror 806, and mirror 808. The light propagating through the cavity 802 of the gyroscope 800 constructively interferes with itself to create two counter rotating beams, one traveling in the CW direction and the other traveling in the CCW direction, both with a wavelength of approximately 633 nanometers, in this example, while the gyroscope is stationary. These beams are also sometimes referred to by other names, such as laser fields, light fields, or laser beams. Light from both of the beams is tapped off through one or more of the mirrors and the light from the CW beam is interfered with light from the CCW beam to determine the frequency difference between the CW and CCW beams. To avoid confusion in the drawings, the structure for tapping and interfering the two laser beams is not shown. The tapping-off of the laser beams occurs pursuant to established procedures. In other embodiments, different amounts of electrodes or other methods and medium exciters are used to excite the gain medium in the cavity 802. For example, in some embodiments optical pumping is used to excite a crystalline solid gain medium. Components and methods used for optical pumping are known to one having skill in the art.

The gyroscope 800 also includes a first optical resonator 820 coupled to the interior cavity 802 through the first mirror 804. The first optical resonator 820 includes a first passive optical cavity 822. The first passive optical cavity 822 does not include a gain medium. In some implementations, the first passive optical cavity 822 is field with a vacuum. In other embodiments, the first passive optical cavity 822 is filed with a gas that does not interact with the light generated by the gain medium 810 of the first interior cavity 802. The first passive optical cavity 820 forms a square. The first mirror 804 is positioned at a first corner of the square formed by the first passive optical cavity 822. A fifth mirror 824 is positioned at a second corner of the square formed by the first passive optical cavity 822. A sixth mirror 825 is positioned at a third corner of the square formed by the first passive optical cavity 820. A seventh mirror 826 is positioned at a fourth corner of the square formed by the first passive optical cavity 820. While a plurality of reflective surfaces is described with respect to exemplary embodiments, a continuous reflective surface (such as is used in a fiber-optic ring laser gyroscope) can also be used to implement first optical resonator 820.

The length of the first passive optical cavity 822 between mirror 804 and mirror 824 is L53. The length of the first passive optical cavity 822 between mirror 824 and mirror 825 is L55. The length of the first passive optical cavity 822 between mirror 825 and mirror 826 is L57. The length of the first passive optical cavity 822 between mirror 826 and mirror 804 is L59. In other embodiments, the first passive optical cavity 822 forms other shapes and/or greater or fewer mirrors are used in the gyroscope 800. While mirrors are described in this embodiment, other embodiments may use other reflective surfaces. In other example embodiments, reflective structures such as Bragg gratings, photonic crystals, etc. may be employed, or the multiplicity of reflective surfaces may be replaced by a continuous surface as in a fiber ring or solid structure optical resonator. Still, the dispersion inherent in such wavelength-dependent reflectors will also impact the overall dispersion present in the gyroscope and should be taken into account. Some additional shapes and quantities of passive optical cavities are shown in FIGS. 1 and 6-7 and described above.

The gyroscope 800 also includes a second optical resonator 828 coupled to the first optical resonator 820 through the seventh mirror 826. The second optical resonator 828 includes a second passive optical cavity 830. The second passive optical cavity 830 does not include a gain medium. In some implementations, the second passive optical cavity 830 is filed with a vacuum. In some implementations, the second passive optical cavity 830 is filled with a gas that does not interact with the light generated by the gain medium 810 of the first interior cavity 802. The second passive optical cavity 830 forms a square. The seventh mirror 826 is positioned at a first corner of the square formed by the second passive optical cavity 830. An eighth mirror 832 is positioned at a second corner of the square formed by the second passive optical cavity 830. A ninth mirror 834 is positioned at a third corner of the square formed by the second passive optical cavity. A tenth mirror 835 is positioned at a fourth corner of the square formed by the second passive optical cavity 830. While a plurality of reflective surfaces is described with respect to exemplary embodiments, a continuous reflective surface (such as is used in a fiber-optic ring laser gyroscope) can also be used to implement second optical resonator 828.

The length of the second passive optical cavity 830 between mirror 826 and mirror 832 is L61. The length of the second passive optical cavity 830 between mirror 832 and mirror 834 is L63. The length of the second passive optical cavity 830 between mirror 834 and mirror 835 is L65. The length of the second passive optical cavity 830 between mirror 835 and mirror 826 is L67. In other embodiments, the second passive optical cavity 830 forms other shapes and/or greater or fewer mirrors are used in the gyroscope 800. While mirrors are described in this embodiment, other embodiments may use other reflective surfaces. In other example embodiments, reflective surfaces such as Bragg gratings, photonic crystals, etc. may be employed, but the dispersion inherent in such wavelength-dependent reflectors will also impact the overall dispersion present in the gyroscopes and should be taken into account. Some additional shapes and quantities of passive optical cavities are shown in FIGS. 1 and 6-7 and described above.

Figure 9:
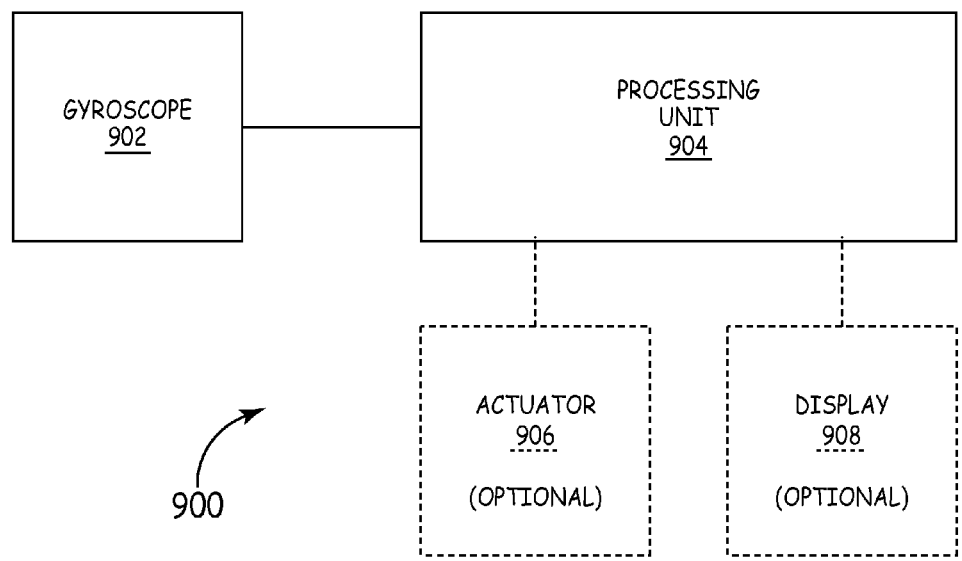
FIG. 9 is a block diagram depicting an exemplary system including a dispersion enhanced ring laser gyroscope having coupled cavities and an enhanced scale factor.

FIG. 9 is a block diagram depicting an exemplary system 900 including a fast light ring laser gyroscope having an enhanced scale factor. The system 900 includes a gyroscope 902, such as exemplary fast light ring laser gyroscope 100, 600, 700, or 800 described above. In addition to the gyroscope 902, the system 900 also includes a processing unit 904. The gyroscope 902 is communicatively coupled to the processing unit 904. The processing unit 904 includes a processor and memory. The processing unit 904 includes or functions with software programs, firmware or other computer readable instructions for carrying out various methods, process tasks, calculations, and control functions, used in the processing of signals from the gyroscope 902. For example, in some embodiments, system 900 is a navigation system. In these embodiments, the processing unit 904 calculates navigation parameters based on the signals from the gyroscope 902.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Some embodiments of the system 900 also include at least one actuator 906 and/or at least one display 908. The actuator 906 is actuated by the processing unit 604 based on information received from the gyroscope 902. For example, in some embodiments, the processing unit 904 provides control signals, based on calculated navigation parameters, to the actuator 906 to engage a flap, aileron, elevator, or other control surface on an aircraft. It is to be understood that the implementation of actuator 906 is dependent on the implementation of system 900. The display 908 outputs information received from, or related to data from, the gyroscope 902. For example, the display 908 could display the rotational rate of an aircraft, vehicle, or other object.

Figure 10:
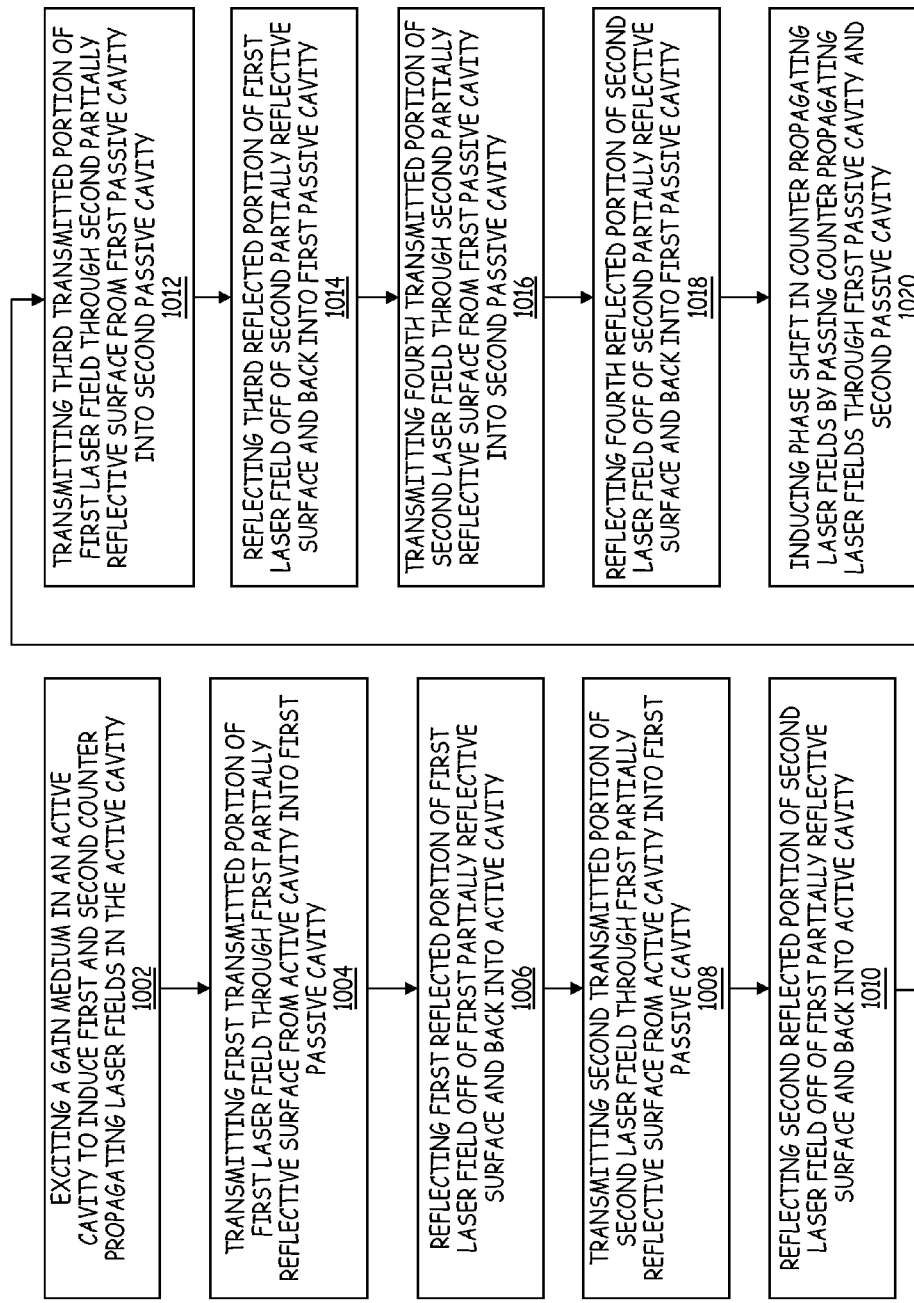
FIG. 10 is a flow chart depicting one embodiment of a method of making a fast light gyroscope having an enhanced scale factor.

FIG. 10 is a flow chart depicting one embodiment of a method 1000 of increasing a scale factor of a fast light gyroscope. At block 1002, a gain medium in an active cavity is excited to induce first and second counter propagating laser fields in the active cavity. In example embodiments, the portion of the gas is excited by a current that is applied across the portion of the gas. At block 1004, a first transmitted portion of the first laser field is transmitted through a first partially reflective surface from the active cavity into a first passive cavity. At block 1006, a first reflected portion of the first laser field is reflected off of the first partially reflective surface and back into the active cavity. At block 1008, a second transmitted portion of the second laser field is transmitted through the first partially reflective surface from the active cavity into the first passive cavity. At block 1010, a second reflected portion of the second laser field is reflected off of the first partially reflective surface and back into the active cavity.

At block 1012, a third transmitted portion of the first laser field is transmitted through a second partially reflective surface from the first passive cavity into a second passive cavity. At block 1014, a third reflected portion of the first laser field is reflected off of the second partially reflective surface and back into the first passive cavity. At block 1016, a fourth transmitted portion of the second laser field is transmitted through a second partially reflective surface from the first passive cavity into the second passive cavity. At block 1018, a fourth reflected portion of the second laser field is reflected off of the second partially reflective surface and back into the first passive cavity.

At block 1020, a phase shift is induced in the counter propagating laser fields by passing the counter propagating laser fields through the first passive cavity and the second passive cavity.

Figure 11:
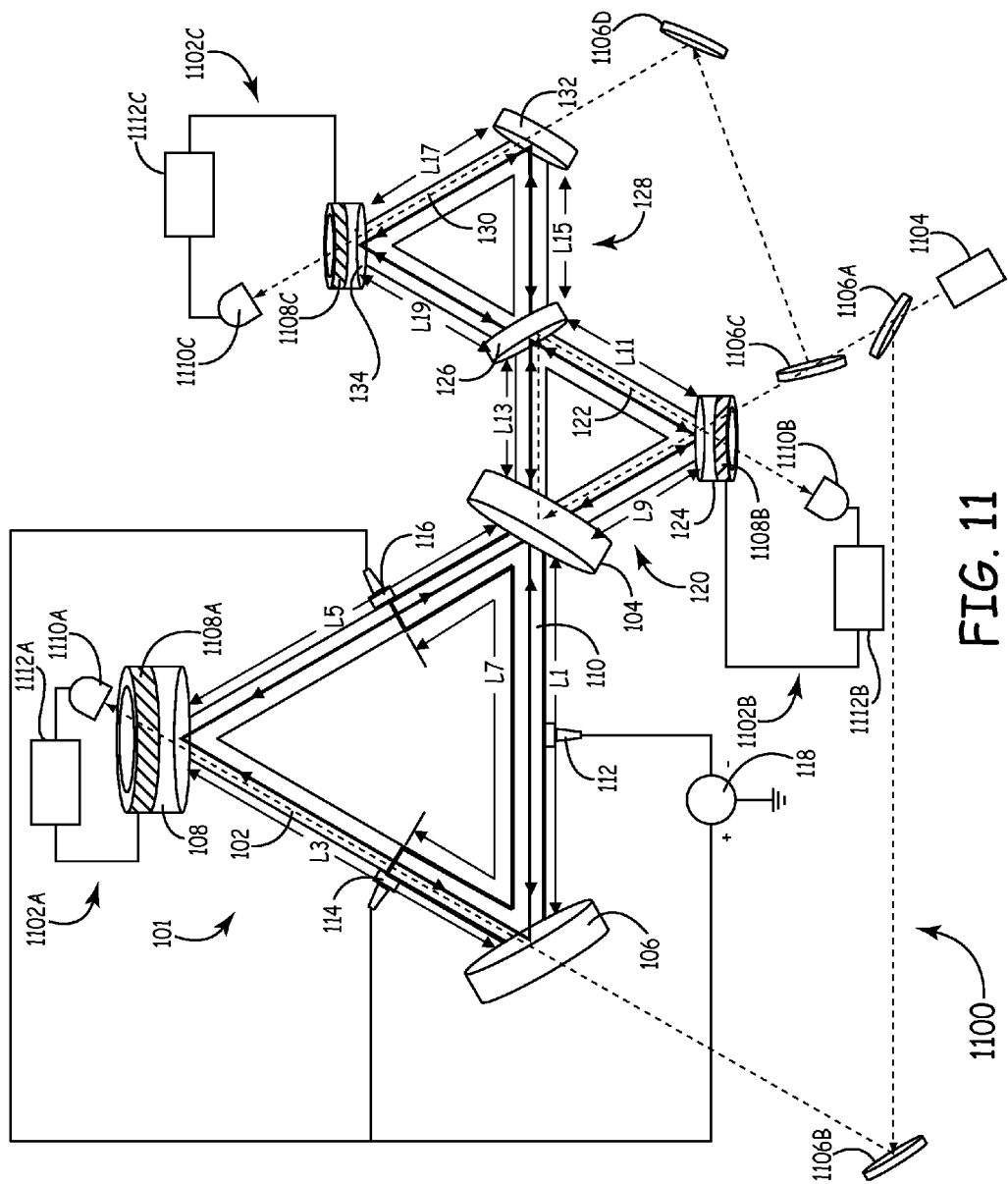
FIG. 11 is a block diagram depicting another exemplary embodiment of a dispersion enhanced ring laser gyroscope having coupled cavities and an enhanced scale factor.

FIG. 11 is a block diagram depicting an exemplary fast light ring laser gyroscope 1100 having an enhanced scale factor. The gyroscope 1100 includes all the same components as the exemplary fast light ring laser gyroscope 100 of FIG. 1, including the first optical resonator 120 and the second optical resonator 128. Gyroscope 1100 operates according to the same principles and methods as gyroscope 100 described above. The common components shared between gyroscope 1100 and gyroscope 100 operate according to the description of gyroscope 100 above.

In addition, gyroscope 1100 also includes three servo feedback loops 1102 (including servo feedback loop 1102A, servo feedback loop 1102B, and servo feedback loop 1102C). Each servo feedback loop is used to lock the resonant frequency of a corresponding cavity (including first interior cavity 102, first passive optical cavity 122, and second passive cavity 130). Specifically, in the example embodiment shown in FIG. 11, servo feedback loop 1102A locks the resonant frequency of first interior cavity 102, servo feedback loop 1102B locks the resonant frequency of first passive optical cavity 122, and servo feedback loop 1102C locks the resonant frequency of second passive optical cavity 130. In other implementations, other quantities of servo feedback loops 1102 are included to lock the resonant frequency of additional cavities.

Each servo feedback loop receives a light beam from a light source. In the example embodiment shown in FIG. 11, the light source is a single frequency stabilized multi-mode locking laser 1104. The multi-mode locking laser 1104 emits a laser beam having a frequency stabilized mode associated with each servo feedback loop 1102. Specifically, a first mode is centered at a first frequency associated with servo feedback loop 1102A, a second mode is centered at a second frequency associated with servo feedback loop 1102B, and a third mode is centered at a third frequency associated with servo feedback loop 1102C. The modes of the locking laser 1104 are at different frequencies from the resonant frequencies of the CW and CCW beams so as to not interfere with the CW and CCW beams. In other embodiments, instead of a multi-mode locking laser 1104, a single-mode laser is modulated to introduce a number of sidebands at various frequencies. In these embodiments, the single-mode laser is modulated by a very stable microwave source, causing an output of frequency sidebands separated by a known frequency difference. The carrier band and the side bands are then utilized in a similar manner to the various modes described in the multi-mode laser 1104 below.

A set of mirrors 1106 (including mirror 1106A, mirror 1106B, mirror 1106C, mirror 1106D) are used to send each mode of the multi-mode laser associated to its corresponding cavity. In some embodiments, the cavity mirror coatings are bi-chromatic, meaning they reflect at two wavelengths. Thus, in some embodiments, the gyroscope itself operates at a first wavelength (such as 633 nanometers (red)) and control system operates at a second wavelength (such as 532 nanometers (green)). In some embodiments, while light from each of the modes (or carrier frequency and sidebands) passes throughout the system and is reflected by the mirrors, each of the cavities is locked to a different mode. Thus, even though light from all of the modes may be present in each of the cavities, each servo feedback loop 1102 only uses one modes that is associated with the same cavity as the servo feedback loop 1102.

Regarding the first servo feedback loop 1102A, mirror 1106A reflects light from the first mode to mirror 1102B and into one side of the first interior cavity 102 through mirror 106. The light from the first mode travels through the one side of the first interior cavity 102 of length L3 and exits the first interior cavity 102 through mirror 108, where it passes through a center cavity in a first ring shaped piezoelectric actuator 1108A and to a detector 1110A. Detector 1110A detects the amount of the first mode laser light received at the detector 1110A and passes information about the amount of light received to a servo 1112A. If the length of the first interior cavity 102 changes due to thermal drift and vibration, the resonant frequency of the first interior cavity 102 changes and the amount of the first mode laser light transmitted through the first interior cavity 102 and received at the detector 1110A decreases.

Based on the information received from the detector 1110A, the servo 1112A detects when the frequency of the first mode laser light is varying from its resonant frequency and generates a voltage that is applied to the piezoelectric actuator 1108A. Based on this signal, the piezoelectric actuator 1108A adjusts the dimensions of the first interior cavity 102, thereby bringing the relevant lengths back to resonance for the first mode laser light. Thus, the piezoelectric actuator 1108A is used to offset any frequency drift due to environmental factors and to correct for any frequency drift in the first mode laser light. Specifically, the voltage causes the piezoelectric actuator 1108A to change lengths, thereby altering the lengths of the sides of the first interior cavity 102. In order to counter the effects of thermal drift and vibration, these voltages are adjusted in real time. In other embodiments, the dimensions of the first interior cavity 102 are changed in other ways to compensate for thermal drift, vibration, and other errors.

Regarding the second servo feedback loop 1102B, mirror 1106A lets light from the second and third modes of the multi-mode laser pass through. Mirror 1106C lets light from the second mode pass through and into one side of the first passive optical cavity 122 through mirror 124. The light from the first mode travels through the one side of the first passive optical cavity 122 of length L9, reflects off of mirror 104, travels through a second side of the first passive optical cavity 122 of length L13, reflects off of the mirror 126, travels through a third side of the first passive optical cavity 122 of length L11 and exits the first passive optical cavity 122 through mirror 124, where it passes through a center cavity in a second ring shaped piezoelectric actuator 1108B and to a detector 1110B. Detector 1110B detects the amount of the second mode laser light received at the detector 1110B and passes information about the amount of light received to a servo 1112B. If the length of the first passive optical cavity 122 changes due to thermal drift and vibration, the resonant frequency of the first passive optical cavity 122 changes and the amount of the second mode laser light transmitted through the first passive optical cavity 122 and received at the detector 1110B decreases.

Based on the information received from the detector 1110B, the servo 1112B detects when the frequency of the second mode laser light is varying from its resonant frequency and generates a voltage that is applied to the piezoelectric actuator 1108B. Based on this signal, the piezoelectric actuator 1108B adjust the dimensions of the first passive optical cavity 122, thereby bringing the relevant lengths back to resonance for the second mode laser light. Thus, the piezoelectric actuator 1108B is used to offset any frequency drift due to environmental factors and to correct for any frequency drift in the second mode laser light. Specifically, the voltage causes the piezoelectric actuator 1108B to change lengths, thereby altering the lengths of the sides of the first passive optical cavity 122. In order to counter the effects of thermal drift and vibration, these voltages are adjusted in real time. In other embodiments, the dimensions of the first passive optical cavity 122 are changed in other ways to compensate for thermal drift, vibration, and other errors.

Regarding the third servo feedback loop 1102C, mirror 1106C reflects light from the third mode to mirror 1106D and into one side of the second passive optical cavity 130 through mirror 132. The light from the third mode travels through the one side of the second passive optical cavity 130 and exits the second passive optical cavity 130 through mirror 134, where it passes through a center cavity in a third ring shaped piezoelectric actuator 1108C and to a detector 1110C. Detector 1110C detects the amount of the third mode laser light received at the detector 1110C and passes information about the amount of light received to a servo 1112C. If the length of the second passive optical cavity 130 changes due to thermal drift and vibration, the resonant frequency of the second passive optical cavity 130 changes and the amount of the third mode laser light transmitted through the second passive optical cavity 130 and received at the detector 1110C decreases.

Based on the information received from the detector 1110C, the servo 1112C detects when the frequency of the third mode laser light is varying from its resonant frequency and generates a voltage that is applied to the piezoelectric actuator 1108C. Based on this signal, the piezoelectric actuator 1108C adjusts the dimensions of the second passive optical cavity 130, thereby bringing the relevant lengths back to resonance for the third mode laser light. Thus, the piezoelectric actuator 1108C is used to offset any frequency drift due to environmental factors and to correct for any frequency drift in the first mode laser light. Specifically, the voltage causes the piezoelectric actuator 1108C to change lengths, thereby altering the lengths of the sides of the second passive optical cavity 130. In order to counter the effects of thermal drift and vibration, these voltages are adjusted in read time. In other embodiments, the dimensions of the second passive optical cavity 130 are changed in other ways to compensate for thermal drift, vibration, and other errors.

Figure 12:
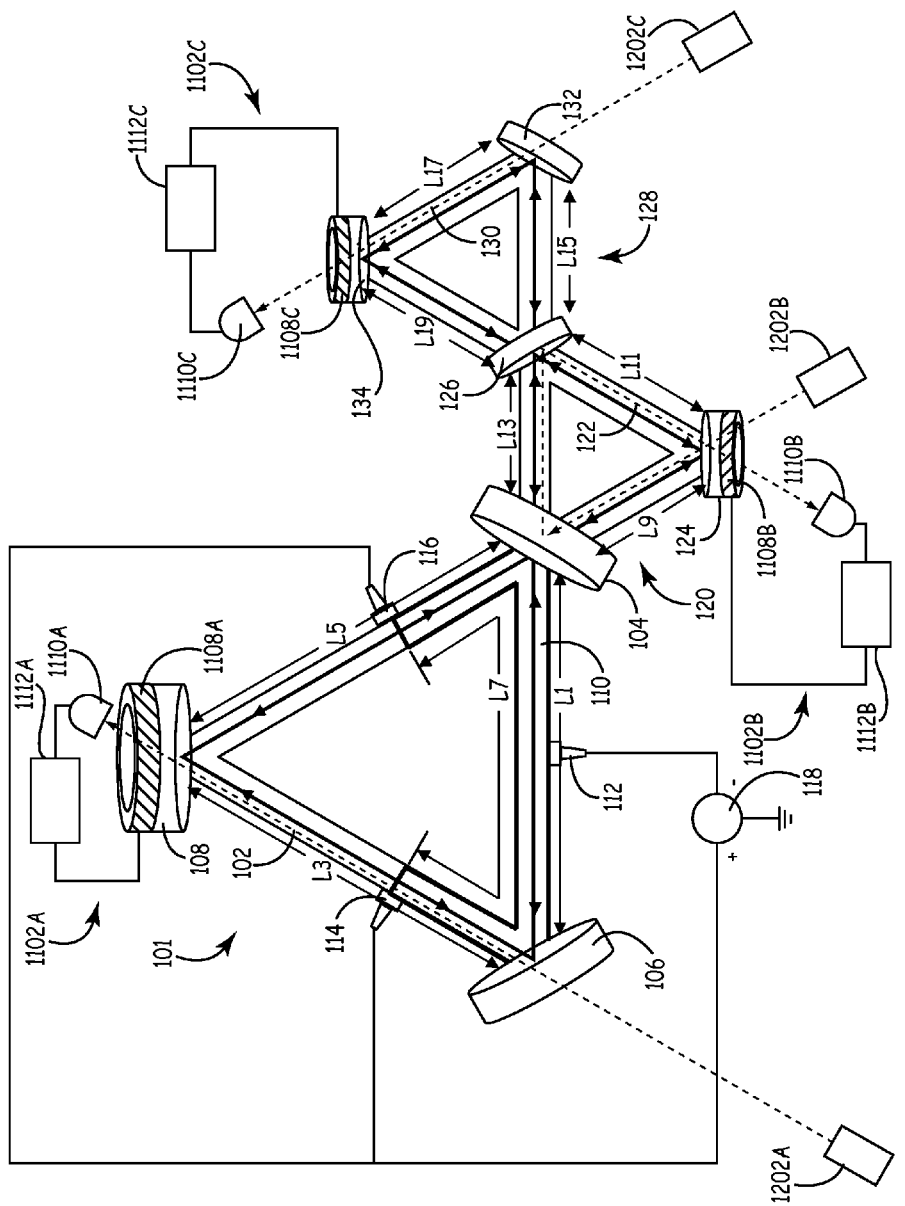
FIG. 12 is a block diagram depicting another exemplary embodiment of a dispersion enhanced ring laser gyroscope having coupled cavities and an enhanced scale factor.

FIG. 12 is a block diagram depicting another exemplary fast light ring laser gyroscope 1200 having an enhanced scale factor. The gyroscope 1200 includes most of the same components as gyroscope 1100, including servo feedback loops 1102. Gyroscope 1200 is different from gyroscope 1100 because it uses three separate stabilized lasers 1202 (including stabilized laser 1202A, stabilized laser 1202B, and stabilized laser 1202C) instead of a single laser with multiple modes or a modulated laser with multiple sidebands distributed to the various cavities using the set of mirrors 1106.

Each of the stabilized lasers 1202 operate at different resonant frequencies, providing a separate frequency for each of the servo feedback loops 1102. Each of the stabilized lasers 1202 are stabilized to a stable frequency source, such as an atomic source to minimize drift and noise. Gyroscope 1200 operates similarly to gyroscope 1100, where the different frequencies of each stabilized laser 1202 is used for feedback in a different cavity as part of a different servo feedback loop 1102.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above operate using HeNe lasers, it is to be understood that other types of lasers could also be used. In addition, although the exemplary embodiments described above include ring laser gyroscopes having cavities shaped like triangles with mirrors placed at each of the three corners of the triangle, it is to be understood that the cavities could also be other shapes and greater or fewer mirrors could be used. Therefore, it is manifestly intended that this invention be limited only by the claims and the equivalents thereof.

What is claimed is:
1. A ring laser gyroscope comprising:
an active cavity containing a gain medium;
a first plurality of reflective surfaces coupled to the active cavity, the first plurality of reflective surfaces including at least a first reflective surface, a second reflective surface, and a third reflective surface, wherein the first reflective surface, the second reflective surface, and the third reflective surface of the first plurality of reflective surfaces are positioned to reflect light along a path defined in the active cavity between the first plurality of reflective surfaces;
at least one medium exciter operable to excite the gain medium, wherein the excited gain medium induces first and second laser fields within the active cavity, wherein the first laser field travels in a clockwise direction within the active cavity and the second laser field travels in a counter-clockwise direction within the active cavity;
a first passive cavity coupled to the active cavity through the first reflective surface, wherein the first passive cavity is devoid of gain media;
a second plurality of reflective surfaces coupled to the first passive cavity, the second plurality of reflective surfaces including at least the first reflective surface, a fourth reflective surface, and a fifth reflective surface, wherein the first reflective surface, the fourth reflective surface, and the fifth reflective surface of the second plurality of reflective surfaces are positioned to reflect light along a path defined in the first passive cavity between the second plurality of reflective surfaces;
a second passive cavity coupled to the first passive cavity through the fourth reflective surface, wherein the second passive cavity is devoid of gain media;

a third plurality of reflective surfaces coupled to the second passive cavity, the third plurality of reflective surfaces include at least the fourth reflective surface, a sixth reflective surface, and a seventh reflective surface, wherein the fourth reflective surface, the sixth reflective surface, and the seventh reflective surface of the third plurality of reflective surfaces are positioned to reflect light along a path defined in the second passive cavity between the third plurality of reflective surfaces;

wherein the first reflective surface and the fourth reflective surface are partially transmissive such that a first portion of light incident on the first reflective surface is reflected, a second portion of light incident on the first reflected surface is transmitted, a third portion of light incident on the fourth reflective surface is reflected, and a fourth portion of light incident on the fourth reflective surface is transmitted; and wherein at least one of the second and third cavities induce a frequency dependent phase shift on light traveling through the ring laser gyroscope causing anomalous dispersion of the first and second laser fields passing through the gain medium.

2. The ring laser gyroscope of claim 1, wherein the active cavity includes a first section between the first reflective surface and the second reflective surface, a second section between the second reflective surface and the third reflective surface, and a third section between the first reflective surface and the third reflective surface; and wherein the gain medium fills the entire second section and portions of the first and third sections.

3. The gyroscope of claim 1, wherein the gain medium is a helium neon gas.

4. The gyroscope of claim 1, wherein the gain medium is a gas; and wherein the at least one medium exciter comprises at least one current generating device that applies a current across the gas.

5. The gyroscope of claim 1, wherein the active cavity, the first passive cavity, and the second passive cavity form triangles with one of the reflective surfaces at each corner.

6. The gyroscope of claim 1, wherein the first plurality of reflective surfaces includes an eighth reflective surface;

wherein the second plurality of reflective surfaces includes a ninth reflective surface;

wherein the third plurality of reflective surfaces includes a tenth reflective surface; and wherein the active cavity, the first passive cavity, and the second passive cavity form squares with one of the reflective surfaces at each corner.

7. The gyroscope of claim 1, wherein the second plurality of reflective surfaces includes an eighth reflective surface;

wherein the third plurality of reflective surfaces includes a ninth reflective surface;

wherein the active cavity forms an triangle with one of the reflective surfaces at each corner; and wherein the second and third cavities form hourglass shapes with one of the reflective surfaces at each corner.

8. The gyroscope of claim 1, wherein at least one of the first passive cavity and the second passive cavity contain a vacuum.

9. The gyroscope of claim 1, wherein at least one of the first passive cavity and the second passive cavity contain a gas that does not interact with the first or second laser fields.

10. The gyroscope of claim 1, further comprising:
a first servo feedback loop operable to detect and compensate for frequency drift in the active cavity;
a second servo feedback loop operable to detect and compensate for frequency drift in the first passive cavity; and
a third servo feedback loop operable to detect and compensate for frequency drift in the second passive cavity.

11. The gyroscope of claim 10, wherein the first servo feedback loop includes:
a first detector operable to detect a first intensity of a first stable laser frequency in the active cavity;
a first servo operable to generate a first voltage based on the first detected intensity; and
a first piezoelectric actuator operable to adjust a first length of the active cavity based on the first voltage;
wherein the second servo feedback loop includes:
a second detector operable to detect a second intensity of a second stable laser frequency in the first passive cavity;
a second servo operable to generate a second voltage based on the second detected intensity; and
a second piezoelectric actuator operable to adjust a second length of the first passive cavity based on the second voltage; and
wherein the third servo feedback loop includes:
a third detector operable to detect a third intensity of a third stable laser frequency in the second passive cavity;
a third servo operable to generate a third voltage based on the third detected intensity; and
a third piezoelectric actuator operable to adjust a third length of the second passive cavity based on the third voltage.

12. A system comprising:
a processing unit;
a ring laser gyroscope coupled to the processing unit, the ring laser gyroscope including:
an active cavity containing a gain medium;
a first plurality of reflective surfaces coupled to the active cavity, the first plurality of reflective surfaces including at least a first reflective surface, a second reflective surface, and a third reflective surface, wherein the first reflective surface, the second reflective surface, and the third reflective surface of the first plurality of reflective surfaces are positioned to reflect light along a path defined in the active cavity between the first plurality of reflective surfaces;
at least one medium exciter operable to excite the gain medium, wherein the excited gain medium induces first and second laser fields within the active cavity, wherein the first laser field travels in a clockwise direction within the active cavity and the second laser field travels in a counter-clockwise direction within the active cavity;
a first optical resonator coupled to the active cavity through the first reflective surface, wherein the first optical resonator is devoid of gain media;
a second plurality of reflective surfaces coupled to the first optical resonator, the second plurality of reflective surfaces including at least the first reflective surface, a fourth reflective surface, and a fifth reflective surface, wherein the first reflective surface, the fourth reflective surface, and the fifth reflective surface of the second plurality of reflective surfaces are positioned to reflect light along a path defined in the first optical resonator between the second plurality of reflective surfaces;

a second optical resonator coupled to the first optical resonator through the fourth reflective surface, wherein the second optical resonator is devoid of gain media;

a third plurality of reflective surfaces coupled to the second optical resonator, the third plurality of reflective surfaces include at least the fourth reflective surface, a sixth reflective surface, and a seventh reflective surface, wherein the fourth reflective surface, the sixth reflective surface, and the seventh reflective surface of the third plurality of reflective surfaces are positioned to reflect light along a path defined in the second optical resonator between the third plurality of reflective surfaces;

wherein the first reflective surface and the fourth reflective surface are partially transmissive such that a first portion of light incident on the first reflective surface is reflected, a second portion of light incident on the first reflected surface is transmitted, a third portion of light incident on the fourth reflective surface is reflected, and a fourth portion of light incident on the fourth reflective surface is transmitted; and wherein at least one of the second and third cavities induce a frequency dependent phase shift on light traveling through the ring laser gyroscope causing anomalous dispersion of the first and second laser fields passing through the gain medium; and wherein the processing unit is operable to process signals output from the ring laser gyroscope to calculate at least one navigation parameter.

13. The system of claim 12, wherein the active cavity includes a first section between the first and second mirrors, a second section between the second and third mirrors, and a third section between the first and third mirrors; and wherein the gain medium fills the entire second section and portions of the first and third sections.

14. The system of claim 12, wherein the active cavity, the first optical resonator, and the second optical resonator form triangles with one of the reflective surfaces at each corner.

15. The system of claim 12, wherein the first plurality of reflective surfaces includes an eighth reflective surface;

wherein the second plurality of reflective surfaces includes a ninth reflective surface;

wherein the third plurality of reflective surfaces includes a tenth reflective surface; and wherein the active cavity, the first optical resonator, and the second optical resonator each form at least one of a square, a rectangle, or an hourglass shape with one of the reflective surfaces at each corner.

16. The system of claim 12, wherein at least one of the first optical resonator and the second optical resonator contain at least one of a vacuum and a gas that does not interact with the first or second laser fields.

* * * * *

UNITED STATES PATENT AND TRADEMARK OFFICE
CERTIFICATE OF CORRECTION

PATENT NO. : 8,687,198 B2  
APPLICATION NO. : 13/237212  
DATED : April 1, 2014  
INVENTOR(S) : Salit et al.

Page 1 of 1

It is certified that error appears in the above-identified patent and that said Letters Patent is hereby corrected as shown below:

Title Page, Item (57), Line 35 of the Abstract, replace "Second or third cavities" with --First or second passive cavities--.

In the Claims

At Column 21, Line 18, Claim 1, replace "the second and third cavities" with --the first passive cavity and the second passive cavity--.

At Column 21, Line 59, Claim 6, replace "the second and third cavities" with --the first passive cavity and the second passive cavity--.

At Column 23, Line 23, Claim 12, replace "the second and third cavities" with --the first optical resonator and the second optical resonator--.

At Column 24, Line 5, Claim 13, replace "the first and second mirrors" with --the first reflective surface and the second reflective surface--.

At Column 24, Line 6, Claim 13, replace "the second and third mirrors" with --the second reflective surface and the third reflective surface--.

At Column 24, Line 7, Claim 13, replace "the first and third mirrors" with --the first reflective surface and the third reflective surface--.

Signed and Sealed this  
Seventh Day of October, 2014

Michelle K. Lee  
*Deputy Director of the United States Patent and Trademark Office*